US012595935B2

(12) United States Patent  
Karaca et al.

(10) Patent No.: US 12,595,935 B2  
(45) Date of Patent: Apr. 7, 2026

(54) SOLAR RECEIVER

(71) Applicant: ODQA RENEWABLE ENERGY TECHNOLOGIES LIMITED, London (GB)

(72) Inventors: Gediz Karaca, London (GB); Peter Ireland, Oxford (GB); Tsun Holt Wong, Oxford (GB); Ed Wood, Oxford (GB)

(73) Assignee: ODQA RENEWABLE ENERGY TECHNOLOGIES LIMITED, London (GB)

( * ) Notice: Subject to any disclaimer, the term of this patent is extended or adjusted under 35 U.S.C. 154(b) by 354 days.

(21) Appl. No.: 18/041,565

(22) PCT Filed: Aug. 12, 2021

(86) PCT No.: PCT/GB2021/052096  
§ 371 (c)(1),  
(2) Date: Feb. 14, 2023

(87) PCT Pub. No.: WO2022/034332  
PCT Pub. Date: Feb. 17, 2022

(65) Prior Publication Data  
US 2024/0044552 A1 Feb. 8, 2024

(30) Foreign Application Priority Data  
Aug. 14, 2020 (GB) ...................................... 2012753

(51) Int. Cl.  
*F24S 10/70* (2018.01)  
*F24S 10/25* (2018.01)  
*F24S 20/20* (2018.01)

(52) U.S. Cl.  
CPC ............. *F24S 10/742* (2018.05); *F24S 10/25* (2018.05); *F24S 2010/71* (2018.05); *F24S 2020/23* (2018.05)

(58) Field of Classification Search  
CPC ...... F24S 10/742; F24S 10/25; F24S 2010/71; F24S 2010/23; F24S 2020/23  
(Continued)

(56) References Cited

U.S. PATENT DOCUMENTS

| | | | |
|---|---|---|---|
| 4,015,584 A | 4/1977 | Haberman | |
| 4,079,591 A * | 3/1978 | Derby ...................... | F24S 70/60 |
| | | | 60/659 |

(Continued)

FOREIGN PATENT DOCUMENTS

| | | |
|---|---|---|
| DE | 10 2010 063116 A1 | 6/2012 |
| DE | 10 2018 201319 A1 | 8/2019 |

(Continued)

OTHER PUBLICATIONS

International Search Report dated Oct. 21, 2021 (4 pages) from PCT Priority Application PCT/GB2021/052096.

(Continued)

*Primary Examiner* — Vivek K Shirsat  
(74) *Attorney, Agent, or Firm* — Crowell & Moring LLP

(57) ABSTRACT

A solar receiver for converting solar radiation into thermal energy. The solar receiver includes a heat-absorbing solid body, a fluid system to provide a flow of working fluid proximate to the heat-absorbing solid body, and a movement device to move the heat-absorbing solid body such that one or more surfaces of the heat-absorbing solid body are periodically exposed to incident solar radiation. The incident solar radiation heats a portion of the heat-absorbing solid body which in turn heats the working fluid. The at least a portion of the heat-absorbing solid body is configured to (Continued)

promote absorption of incident solar radiation, promote transfer of heat from the at least a portion of the heat-absorbing solid body to the working fluid, promote cooling of the at least a portion of the heat-absorbing solid body, or promote any combination thereof.

20 Claims, 8 Drawing Sheets

(58) Field of Classification Search
USPC .......... 126/569, 688–690; 60/641.8, 641.15, 60/641.11
See application file for complete search history.

(56) References Cited

U.S. PATENT DOCUMENTS

| | | | | |
|---|---|---|---|---|
| 9,897,076 B1 * | 2/2018 | Johnson, Jr. | ............ | F24S 30/40 |
| 2009/0241938 A1 * | 10/2009 | Arbogast | .................. | F02C 1/05 |
| | | | | 126/643 |

| | | | |
|---|---|---|---|
| 2010/0258112 A1 | 10/2010 | Viskup, Jr. et al. | |
| 2013/0074829 A1 | 3/2013 | Worthington | |
| 2013/0133324 A1 | 5/2013 | Reynolds | |
| 2014/0261390 A1 | 9/2014 | Chernin et al. | |

FOREIGN PATENT DOCUMENTS

| | | | |
|---|---|---|---|
| WO | WO 2011/153591 A1 | 12/2011 | |
| WO | WO 2014/194017 A1 | 12/2014 | |
| WO | WO 2020/165608 A1 | 8/2020 | |

OTHER PUBLICATIONS

Written Opinion of the International Searching Authority dated Oct. 21, 2021 (9 pages) from PCT Priority Application PCT/GB2021/052096.

International Preliminary Report on Patentability dated Nov. 2, 2022 (14 pages).

Annex to Search Report (11 pages) dated Sep. 8, 2022 (Letter from A.A. Thrornton to IPEA).

* cited by examiner

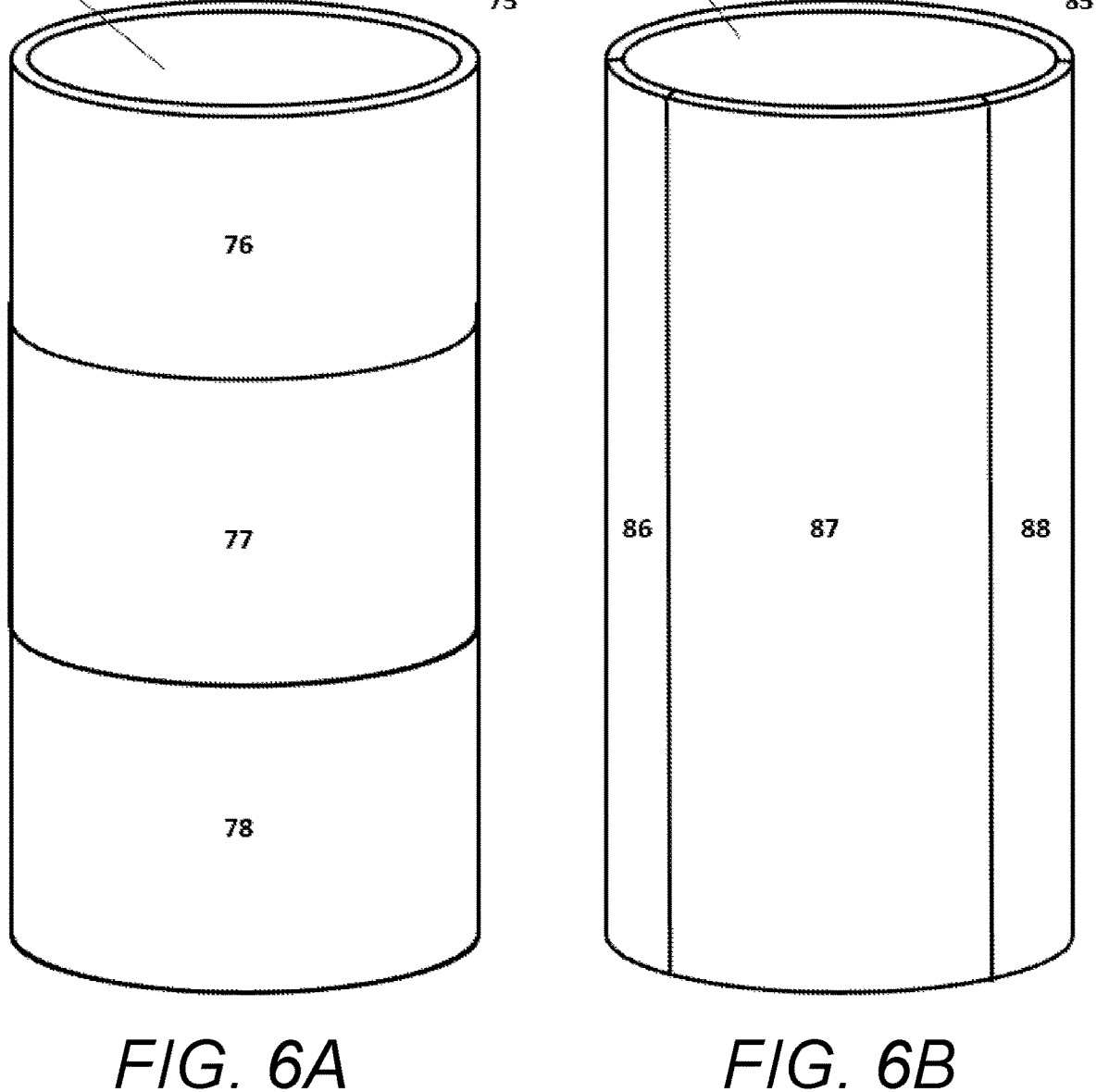
*FIG. 6A*          *FIG. 6B*

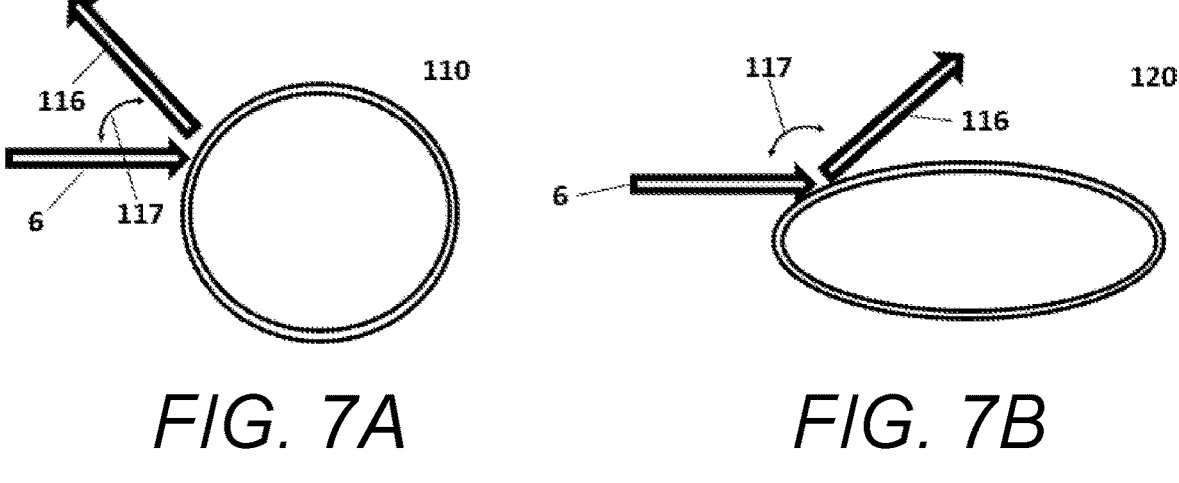
FIG. 7A
FIG. 7B
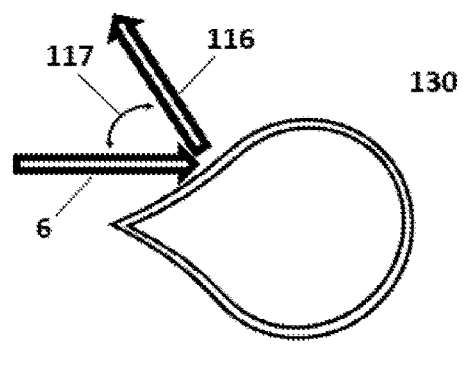
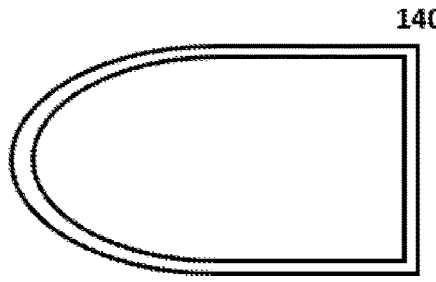
FIG. 7C
FIG. 7D

SOLAR RECEIVER

This application is a national application based on Patent Cooperation Treaty Patent Application No. PCT/GB2021/052096, filed on Aug. 12, 2021, the entire contents of which are incorporated herein by reference.

This application claims under 35 U.S.C. § 119 (a) the benefit of the filing date of Great Britain Patent Application No. 2012753.6, filed on Aug. 14, 2020, the entire contents of which are incorporated herein by reference.

BACKGROUND OF THE INVENTION

Field of Invention

The present invention relates to devices for absorbing solar radiation and converting the absorbed solar radiation into thermal energy, the components of such devices, and methods for using the same. More particularly, the present invention relates to solar receivers for use in the conversion of solar radiation to thermal energy.

Description of Related Art

Concentrated solar systems use a series of optical concentrators including mirrors and/or lenses to concentrate the sunlight incident on large surface areas onto a smaller area from which the energy may be harnessed. In commercial applications, banks of optical concentrators are generally positioned in proximity to a tower or mast supporting a solar receiver. The optical concentrators are positioned such that they will reflect incident solar radiation towards the tower's receiver which absorbs the energy and passes it to a system for subsequent conversion to electrical energy. The optical concentrators are typically fitted with a tracking system that allows them to adjust alignment relative to the position of the sun to ensure that the incident solar radiation continues to be directed towards the tower throughout the day. Power tower arrangements and parabolic trough/trench solar plants are the most common designs of concentrated solar power station.

Receivers in concentrated solar systems are generally divided between solid, liquid and gas types. In principle, the solar radiation is converted into heat energy in the solid, liquid or gas medium of the receiver. The heat from the receiving material is then usually transferred to a working fluid via processes such as conduction and/or convection. The working fluid is then ultimately used in a thermodynamic cycle to produce work. In liquid or gas receivers, the fluid receiving the solar radiation may also be utilised as the working fluid. In general, the absorbing portion of the receiver should have a high absorptance to enable absorption of as great a proportion of the incident solar radiation as possible. For the avoidance of doubt, thermal energy and heat energy as described herein are considered to represent the same form of energy.

Tubular receivers are the most common concentrated solar receivers and generally utilise a metal tube containing a thermally conductive fluid. Solar radiation is concentrated onto the tube and the fluid within becomes heated. The energy collected by the fluid may then be utilised for a variety of purposes including the production of electricity. Molten salt systems operate in a similar manner to tubular receivers. In a molten salt receiver, incident solar radiation is used to heat a solid salt reservoir which then melts when its temperature is increased beyond the melting point of the salt. The molten salt may then flow through standard heat exchange systems to heat the working fluid. Molten salts are often used due to their capability to store heat energy in the molten salt for long periods of time if the reservoirs are suitably insulated. The heated molten salt reservoir may then be utilised during periods of low light, such as during the night. However, there are several challenges in the use of molten salt systems including the safety risk posed by large quantities of high temperature liquids, corrosion of components caused by the salts, the freezing of salts in periods of low light, and the associated contraction and expansion of matter experienced during operating conditions.

Falling particle receivers, also known as solid particle receivers, replace molten salts with flowable solid particles such as sand. In a falling particle system, solar radiation is generally concentrated onto flowing curtains of the particulate which then fall under gravity and pass through standard heat exchange systems to impart their thermal energy to the working fluid. The particulates are then usually returned to the top of the receiver for further use in the particulate curtain. Falling particle systems often suffer from challenges posed by the materials involved, inefficiency of heat transfer between the heated solids and working fluid, and the technical challenges posed by conveying large quantities of solid material in a continuous manner.

Gas based receivers focus the incident solar radiation onto a thermally conductive gas which may then be used to directly drive turbines. Gas based systems often employ honeycomb and porous structures around the absorbing gas to capture additional thermal radiation which is then transferred to the working gas. Gas based receivers to tend to suffer from low absorptance and consequently low efficiency of energy conversion.

Regardless of the absorbing medium, receivers are designed to operate within specific ranges of solar radiation concentration factor. The solar radiation concentration factor, c, is defined as the thermal flux ($W/m^2$) that is incident on surface of the receiver to be heated, divided by the corresponding thermal flux arriving at the system from the sun. This is sometimes known as the 'insolation'. The concentration factor has a direct effect on the efficiency of the system and it is a sensible intent for a designer to try to maximise c. Typically, concentrated solar power stations operate at c values of around 20 to 100, with some Stirling dish designs achieving c values of up to 2000. Greater values of c represent increased energy density which in turn represents a greater potential energy resource that may be harnessed by the receiver. Increasing the c value of a concentrated solar system will induce higher temperatures in the receiver medium. The maximum value of c at which a receiver can operate is thus limited by the thermal tolerances of the receiver and its materials. For example, temperatures in excess of 1000° C. may be achieved as the value of c increases. In systems such as the molten salt systems, such temperatures may induce the thermal decomposition of molten salts. Structural components may also be put at risk by a high c value as structural steel may begin to melt at temperatures of around 1400° C. Receivers may also be at risk from the effects of thermal expansion and contraction upon components in situations where the energy incident upon the receiver is variable, or where the system cycles between active and inactive states.

At high values of c, the heat flux may be particularly fierce. For example, if a system were able to achieve a concentration factor of 10,000 and the insolation was 1,600 $kW/m^2$, then the heat flux at the surface of the solar collector would be 16 $MW/m^2$. Such a high heat flux would engender large temperature gradients and extremely high temperatures within and at the surface of the solar receiver. Such high temperatures and temperature gradients would significantly limit the life of the receiving material. High c values may also introduce additional challenges such as diminishing absorption efficiency as c values increase, overheating of materials due to limitations upon the rate at which energy can be carried away from the absorbing surfaces of the system, and high thermal losses due to emissivity as the total energy of the system increases.

Generally, the greater the density of energy incident upon the receiving surface, the shorter the lifespan of the receiver. The mean thermal irradiance, amplitude of irradiance, period, and exposure time of the radiative cycles may all impact the long term properties of the materials used in the construction of receivers. Even at typical values of 20 to 100 c, the absorptance of receivers may significantly degrade over time, causing decreases in the thermal performance of the receiver in the long term. Furthermore, receivers are an expensive component of concentrated solar power plants. It is estimated that a solar receiver constitutes up to 20% of the initial capital costs of construction of a concentrated solar power plant. It is therefore desirable to avoid or delay the need to replace receivers that show degraded performance.

In effect, established concentrated solar power plant designs can only exploit limited values of c by virtue of their system design and the materials they use. Higher values of c increase the theoretical efficiency of a solar receiver, and there is therefore a need for solar receivers that allow for high values of c while avoiding the drawbacks commonly encountered with the systems known in the art. The solar receivers of the present invention address two particular problems associated with the use of high values of c. The concentration of incident solar radiation that may be used with a solar receiver is often limited by the efficiency of heat transfer between the absorbing medium and the fluid to which the absorbing medium ultimately transfers heat. Moreover, at high values of c, efficiency of absorption may be poor and the proportion of energy lost via reflection, emissive effects or other mechanisms may be significant.

According to the present invention there is provided a solar receiver for converting solar radiation into thermal energy as defined hereafter. Further preferable features of the solar receiver of the present invention are defined hereafter.

One aspect of the invention provides a solar receiver for converting solar radiation at a concentration factor of at least 500 into thermal energy. The solar receiver includes a heat-absorbing solid body, a fluid system to provide a flow of working fluid proximate to the heat-absorbing solid body, and a movement device to move the heat-absorbing solid body such that one or more surfaces of the heat-absorbing solid body are periodically exposed to incident solar radiation. The incident solar radiation heats at least a portion of the heat-absorbing solid body which in turn heats the working fluid proximate to the heat-absorbing solid body. The at least a portion of the heat-absorbing solid body is configured to promote absorption of incident solar radiation, transfer of heat from the at least a portion of the heat-absorbing solid body to the working fluid, cooling of the at least a portion of the heat-absorbing solid body, or any combination thereof.

According to further aspects of the invention, the heat-absorbing solid body of the solar receiver may be a rotor. Where the heat absorbing body is a rotor, the movement device may rotate the heat-absorbing solid body. The movement device may not move, or may not substantially move the heat-absorbing body in a direction along the axis of rotation of the rotor. The heat-absorbing solid body of the solar receiver may include a plurality of absorbing elements. At least a part of each of the plurality of absorbing elements may absorb incident solar radiation in use. The plurality of absorbing elements may include a plurality of conduits, further wherein the at least a portion of the heat-absorbing solid body includes an outer portion of each of the plurality of conduits the fluid system flows working fluid through one or more flowpaths in each of the plurality of conduits. The plurality of absorbing elements may include a plurality of solid absorbers, further wherein the at least a portion of the heat-absorbing solid body includes an outer portion of each of the plurality of solid absorbers and the fluid system flows working fluid across a heated surface of each of the plurality of solid absorbers. The absorbing elements may be arranged such that a first absorbing element of the plurality of absorbing elements at least partially occludes a second absorbing element of the plurality of absorbing elements such that the at least partially occluded portion of the second absorbing element is not exposed to incident solar radiation when the solar receiver is in use. The absorbing elements may be arranged such that a primary absorbing element of the plurality of absorbing elements is exposed to a greater time-averaged flux of solar radiation than a secondary absorbing element of the plurality of absorbing elements. The plurality of absorbing elements may include a near absorbing element and a distal absorbing element, wherein the near absorbing element is positioned proximate to an axis of movement of the heat-absorbing solid body and the distal absorbing element is positioned distant from the axis of movement of the heat-absorbing solid body. The plurality of absorbing elements may be arranged such that at least a portion of solar radiation incident upon at least one of the plurality of absorbing elements is reflected or directed towards an absorbing surface of one or more further absorbing elements. At least one of the plurality of the absorbing elements may be formed from a plurality of materials such that the absorbing surface of the at least one of the plurality of absorbing elements has different solar absorption and/or reflection properties across a surface area upon which solar radiation is incident in use. The surface of at least two of the plurality of absorbing elements that absorb incident solar radiation may be formed from materials with different solar absorption and/or reflection properties respectively. At least one of the plurality of absorbing elements may have a surface topography, morphology, or texture different from the surface topography, morphology, or texture of another of the plurality of absorbing elements such that the absorbing elements have different solar absorption and/or reflection properties. The at least a portion of the heat-absorbing solid body heated by incident solar radiation may include a selective absorption material that selectively absorbs part of the wavelength spectrum of incident solar radiation. A cross-section of at least one of the absorbing elements may be configured to promote transfer of heat to the working fluid from the heated portions of the at least one of the absorbing elements, promote reflection of reflected incident solar radiation reflected from the at least one of the absorbing elements to another absorbing element, and/or promote absorption of incident solar radiation as heat when the solar receiver is in use. The cross-section may be defined as the perimeter shape of a cross-section of at least one of the absorbing elements in a plane coincident, in use, with incident solar radiation. The ratio of a first dimension of the cross-section and a second dimension of the cross-section of the at least one absorbing element may be selected to promote transfer of heat to the working fluid from the heated portions of the at least one of the absorbing elements, promote reflection of reflected incident solar radiation reflected from the at least one of the absorbing elements to another absorbing element, and/or promote absorption of incident solar radiation as heat when the solar receiver is in use. The cross-section of at least one of the absorbing elements may be elliptical in shape, tear-shaped, bullet-shaped, or irregular in shape. The solar receiver may further include one or more optical arrangements to direct incident solar radiation on to the at least a portion of the heat-absorbing solid body. The one or more optical arrangements may be configured to form a beam of solar radiation incident upon the heat-absorbing solid body, further wherein the beam of solar radiation includes cross-sectional regions of different concentrations of solar radiation. The one or more optical arrangements may be configured to direct >95% of solar radiation incident upon the one or more optical arrangements to the heat-absorbing solid body. The one or more optical arrangements may include one or more mirrors, lenses, heliostats, reflectors and/or compound parabolic concentrators (CPCs). The one or more optical arrangements may concentrate solar radiation onto the heat-absorbing solid body at a concentration of up to 10,000. The incident solar radiation may heat the heat-absorbing solid body unevenly. The heat-absorbing solid body may include a material selected from the group consisting of zirconium, zirconium oxide and/or cermets thereof, zirconium bromide and/or cermets thereof, chromium oxide and/or cermets thereof, aluminum oxide and/or cermets thereof, molybdenum, steel, steel alloys, tungsten, high refractive index polymer, high temperature resistant absorptive black paint such as Pyromark 2500, silicon carbide, or combinations thereof.

BRIEF DESCRIPTION OF THE DRAWINGS

Embodiments of the present invention will now be described with reference to the following drawings, in which:

FIGS. 6A, 6B and 6C are configurations of embodiments of absorbing elements, such as conduits or solid absorbers, in accordance with the present invention; and FIGS. 7A, 7B, 7C and 7D are cross sections of various embodiments of conduit or absorber designs that may be used in a solar receiver in accordance with the present invention.

DESCRIPTION OF EMBODIMENTS

Figure 1:
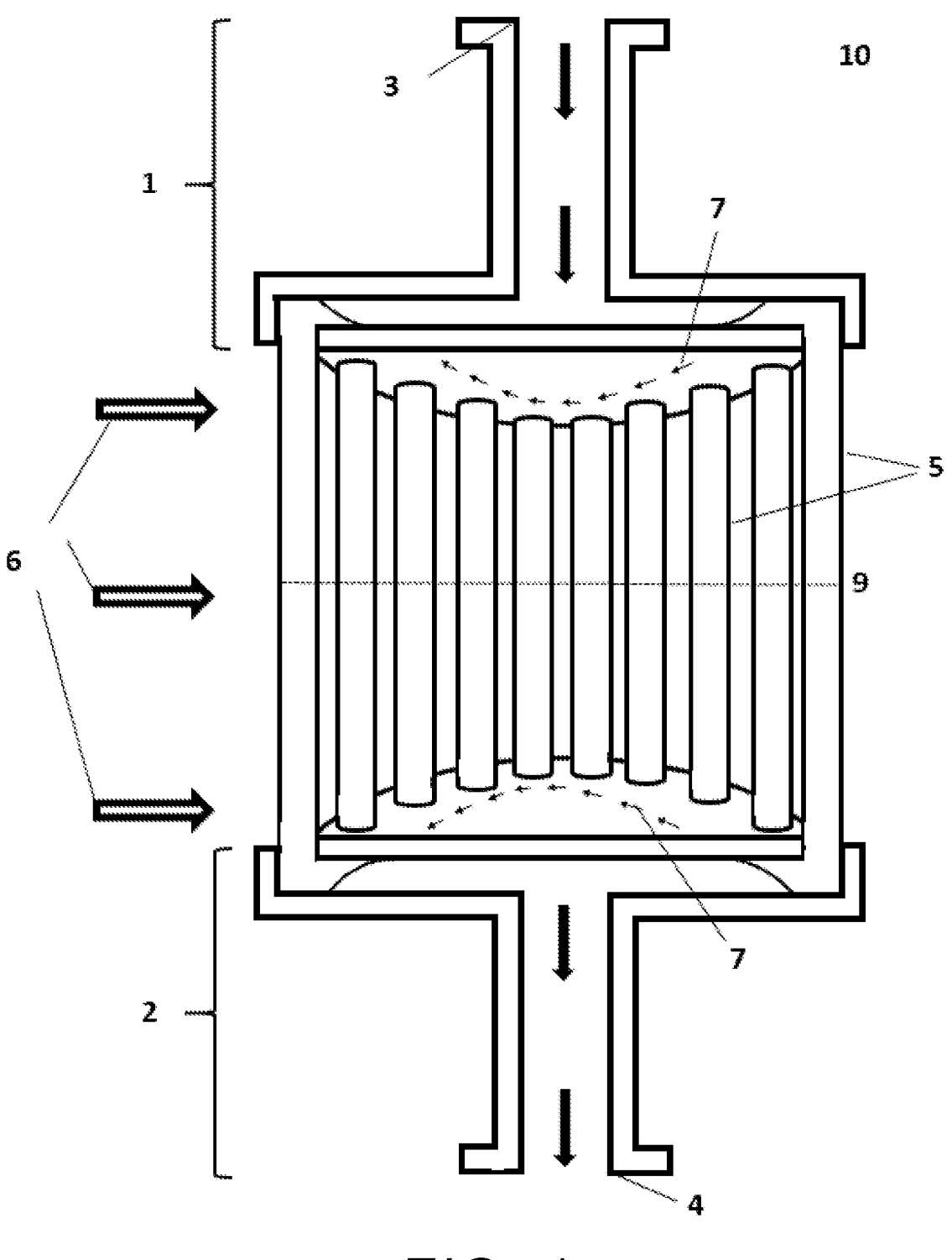
FIG. 1 is a cross-sectional side view of an embodiment of a solar receiver in accordance with the present invention.

In use, the heat-absorbing solid body of the solar receivers of the present invention moves and/or rotates, driven by any suitable driving means such as a motor, drive belt and/or drive wheel arrangement. The heat-absorbing solid body is exposed to various concentrations of solar radiation. In practice, the heat-absorbing solid body moves from a first position to a second positon, and may move in a circuit, a closed loop, rotate fully through 360° or may rotate partly through rotation less than 360°. The movement or rotational direction of the heat-absorbing solid body may be constant, or alternatively, the heat-absorbing solid body may change movement or rotational direction. As such, the heat-absorbing solid body may move or rotate back and forward to rock between two end positions that may be around a rotational axis. The heat-absorbing solid body may move and/or rotate in a single two dimensional plane, or may move and/or rotate through multiple planes in the course of movement and/or rotation. It may be advantageous to rotate the heat-absorbing solid body in a constant direction through 360 degree rotation in a single two dimensional plane.

In embodiments where the heat-absorbing solid body of the solar receiver is a rotor and the movement device at least partly rotates the heat-absorbing solid body, it may be advantageous to move the heat-absorbing solid body such that it does not move, or does not substantially move, along the axis of rotation. In such embodiments, the movement device does not move, or does not substantially move the heat-absorbing body in a direction along the axis of rotation. Therefore, in some implementations, the heat-absorbing solid body will rotate without movement along the axis of rotation. Movement of the heat-absorbing solid body in a solely rotational manner may be advantageous due to the comparable mechanical simplicity of the motion when compared to motion involving rotation and translation along both directions of the rotational axis. Rotating the heat-absorbing solid body while also translating the heat-absorbing solid body along the axis may limit the maximum speed at which the heat-absorbing solid body can be rotated and/or may impart additional or increased mechanical stresses upon the heat-absorbing solid body and its associated systems. Were the rotational speed of the heat-absorbing solid body to be limited in this manner, the rotating body's ability to carry heat away from the area of incident solar radiation would be subsequently reduced. This reduction may, in turn, cause the heat-absorbing solid body to increase in maximum operating temperature which may reduce the lifespan of the materials and increases the risk that the device fails under high concentrations of solar radiation. Movement of the heat-absorbing solid body in a solely or substantially solely rotational manner may therefore allow for the use of greater rotational speeds and increased concentrations of solar radiation.

The heat-absorbing solid body of the solar receiver may be any suitable size depending upon the intended application. A solar tower in a large power plant will require a larger heat-absorbing solid body than a comparable receiver to be employed on a small localised system. In practice, the size of the heat-absorbing solid body is determined by the capacity requirement of the installation in which it is housed and the capability of the working fluid and heat transfer system by which it is accompanied. In general, the heat-absorbing solid body may have a diameter, width, length or dimension of between 1 cm and 10000 cm. Preferably, the heat-absorbing solid body may have a diameter and/or length of between 50 cm and 2000 cm. In other preferable examples, the heat-absorbing solid body may have a diameter and/or length of between 2 cm and 500 cm. In additional preferable examples, the heat-absorbing solid body may have a diameter and/or length of between 5 cm and 300 cm. In one particular example where the heat-absorbing solid body is a rotor in a 1 MW power plant operating at 10,000 c, a cylindrical rotor of approximately 35 cm in height and up to 200 cm in diameter may be utilised. In another particular example where the heat-absorbing solid body is a rotor in a 50 kW to 1 GW power plant operating at approximately 10,000 c, a heat-absorbing solid body of between 50 cm and 2000 cm in height and/or diameter may be used.

The solar receivers of the present invention may utilise a rotor as a heat-absorbing solid body. Any suitable rotor design may be used in the solar receiver suffice that light may be directed to one or more surfaces of the rotor such that the rotor becomes heated, and that the rotor may move or rotate such that the heated portion of the rotor may be cooled by exchanging heat between the rotor surface and a suitable working fluid. Consequently, many alternative rotor designs within the scope of the present invention are envisaged. The heat-absorbing solid body may include, be formed from, or formed in part from a plurality of absorbing elements. Absorbing elements may be solid structures with no internal hollows or cavities, may be hollow solid structures such as conduits that allow flow of fluid therethrough, or any other suitable solid element capable of absorbing incident solar radiation in the form of heat. In use, at least a part of each of the plurality of absorbing elements, where present, absorbs incident solar radiation in use. In an example, the plurality of absorbing elements include one or more conduits. In this example, at least a portion of the outer surface of the conduits are exposed to incident solar radiation such that the conduit becomes heated. Working fluid flowing through the interior of the conduit will become heated due to transfer of heat from the internal surface of the conduit to the working fluid. In this example, the fluid system of the solar receiver flows the working fluid through one or more flowpaths in each of the plurality of conduits and the heated working fluid is carried away to be utilised. In another example, the plurality of absorbing elements include one or more solid absorbers with no internal cavities, void space or hollow portions that allow flow of working fluid therethrough. In this example, at least a portion of the outer surface of the absorbers are exposed to incident solar radiation such that the absorber becomes heated. The fluid system flows working fluid across the heated outer surface of each of the plurality of solid absorbers such that heat is transferred from the absorber to the working fluid. The heated working fluid is then carried away to be utilised.

FIG. 1 shows a cross-sectional schematic representation of a rotor 10 that may be used with the solar receivers described herein. The rotor 10 is formed from two body portions 1, 2 which are substantially discoidal in shape. In practice, the body portions may be any suitable shape although it may be advantageous to utilise discoidal-shaped body portions in some implementations to facilitate ease of rotation. The body portions 1, 2 are substantially hollow such that working fluid may flow into the first body portion 1 via inlet 3 in the first body portion and out of outlet 4 in the second body portion 2. Positioned between the first body portion 1 and the second body portion 2 are a plurality of conduits 5 which represent the absorbing elements of the rotor 10. The conduits may be any suitable shape including, but not limited to square or rectangular in cross section, tubular with a circular or oval cross section, or more complex cross sectional shapes as desired. The conduits are arranged around the outer circumferential periphery of the circular faces of the discoidal body portions 1, 2, such that the conduits 5 connect the first body portion 1 to the second body portion 2. The resulting configuration approximates the shape of a cylindrical cage with the inlet 3 and the outlet 4 extending out from the respective first and second body portions 2, 3 on the opposite side of each body portion from the side to which the conduits 5 are connected. The conduits 5 are substantially hollow and are in fluid communication with the hollow region of each of the first and second body portions 1, 2. In use, working fluid may therefore flow into the rotor via the inlet 3 into the hollow part of the first body portion 1, through the plurality of conduits 5 into the hollow part of the second body portion 2 and then out through the outlet 4. Solar radiation 6 may be directed towards the surface of one or more of the plurality of conduits 5 via one or more optical arrangements. In an example, the solar radiation may be directed from one or more optical arrangements to pass through a slot in an outer housing (not shown) in which the rotor resides such that the light incident upon the rotor 10 is directed towards a surface area greater than, equivalent to, or less than, the surface area of one side of a single conduit 5. Solar radiation 6 incident upon the surface of a conduit 5 will cause the surface of the conduit to become heated. In use, rotor 10 rotates in a direction 7 such that each of the plurality of conduits 5 will periodically become exposed to the solar radiation, and thus heated, in turn. Working fluid is passed through the rotor 10 and over the heated internal surfaces of the plurality of conduits 5 such that heat is transferred from the rotor surfaces to the working fluid cooling the rotor and heating the working fluid. Once cooled, each of the plurality of conduits 5 will eventually be carried back to a position at which it is subjected to further heating via the incident solar radiation 6 due to the rotational movement of the rotor 10. The conduits may be positioned in any suitable arrangement around the periphery of the rotor body. In an example, the conduits may be positioned such that when the rotor is rotating and the incident solar radiation would pass between two conduits on the near side of the rotor, a further conduit will be exposed to the solar radiation on the far side of the rotor due to the solar radiation passing through the gap between the two conduits nearest the source of the solar radiation.

Figure 2:
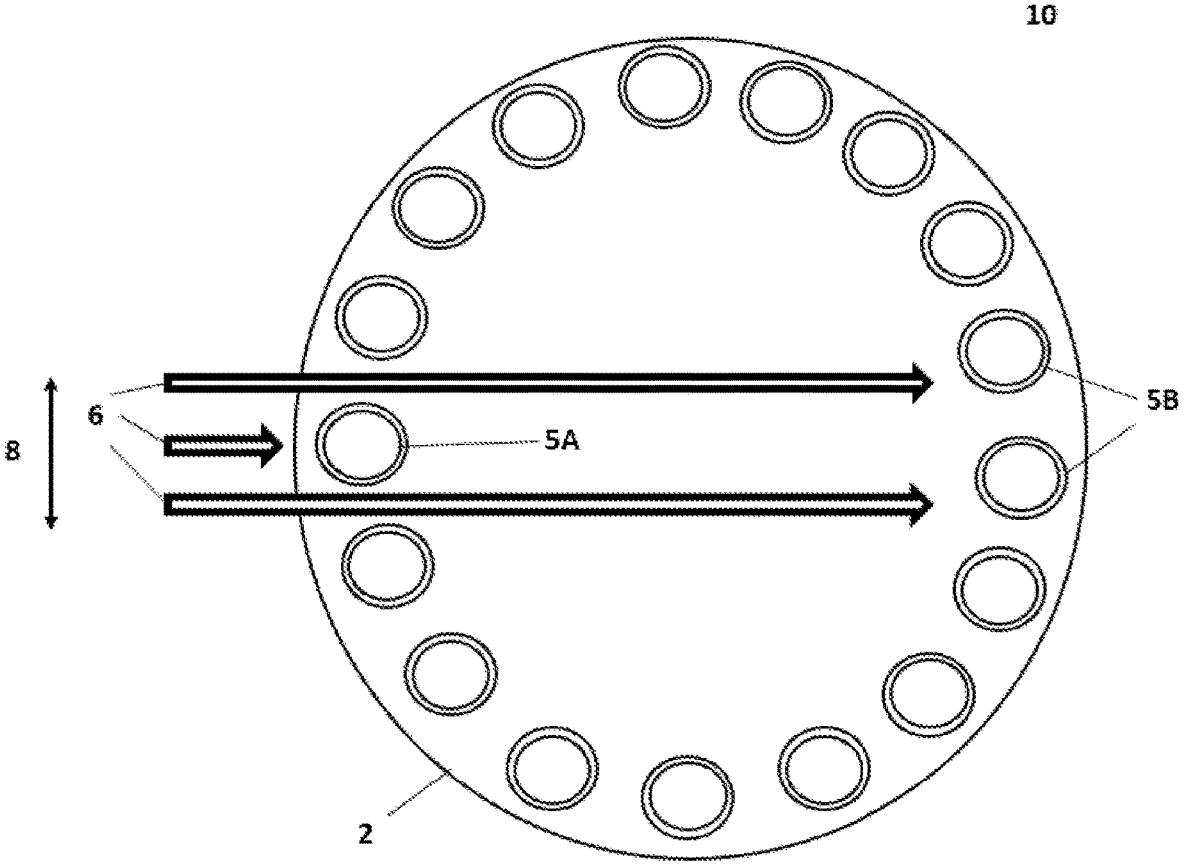
FIG. 2 is a top down cross-sectional view of the solar receiver of FIG. 1.

FIG. 2 shows a top down cross-sectional representation of the rotor of FIG. 1 along plane 9. FIG. 2 demonstrates a configuration where incident solar radiation 6 is of a width 8 greater than the width and/or diameter of a single conduit 5. The incident solar radiation 6 passing either side of conduit 5A passes across the solar rotor and is absorbed, at least in part, by conduits 5B. Although FIG. 2 shows only a schematic representation, the skilled person with the benefit of this disclosure will understand that the conduits can be positioned such that incident solar radiation will be unable to pass through the entirety of the rotor without contacting at least one conduit. Additional conduits may be positioned away from the circumferential periphery of the discoidal rotor bodies and proximate to the centre of the circular surfaces of the bodies as desired. In other examples, solar radiation may be directed towards the rotor 80 from multiple directions via any suitable means. The skilled person will further understand, with the benefit of this disclosure, that the heat-absorbing solid bodies disclosed herein including a conduit arrangement such as that shown in the rotor of FIGS. 1 and 2 may be replaced with a solid cage arrangement where solar radiation is absorbed upon the surface of absorbing elements which include one or more solid absorbers positioned in locations equivalent to the positions of one or more conduits. Where the absorbing elements include one or more solid absorbers in such a design, the heat absorbed by the absorbing elements is transferred to a working fluid flowing across one or more absorbing surfaces of the rotor. A further rotor design may combine both such concepts by flowing working fluid through one or more conduits of the rotor while also transferring heat to a working fluid flowing across at least part of the outer absorbing surface of the rotor.

The rotor arrangement of FIGS. 1 and 2 will, over time, expose each conduit to the same time-averaged solar flux if the concentration of solar radiation and the speed of rotation remains constant in use. However, it may be advantageous to expose different portions of the heat-absorbing solid body or each conduit, where present, to different concentrations or intensities of incident solar radiation such that the time averaged flux experienced by different portions of the heat-absorbing solid body, an individual conduit or a plurality of conduits is different. To this end, the arrangement of absorbing surfaces, or position of conduits, may be configured such that different portions of the absorbing surfaces or conduits are exposed to different quantities of solar radiation and are consequently are heated to different extents. To these ends, the absorbing elements may be arranged such that a first absorbing element of the plurality of absorbing elements at least partially occludes a second absorbing element of the plurality of absorbing elements such that the at least partially occluded portion of the second absorbing element is not exposed to incident solar radiation when the solar receiver is in use. The absorbing elements may be additionally, or alternatively arranged such that a primary absorbing element of the plurality of absorbing elements is exposed to a greater time-averaged flux of solar radiation than a secondary absorbing element of the plurality of absorbing elements. The plurality of absorbing elements may yet further additionally, or alternatively include a near absorbing element and a distal absorbing element, wherein the near absorbing element is positioned proximate to an axis of movement of the heat-absorbing solid body and the distal absorbing element is positioned distant from the axis of movement of the heat-absorbing solid body. Moreover, the plurality of absorbing elements may additionally or alternatively be arranged such that at least a portion of solar radiation incident upon at least one of the plurality of absorbing elements is reflected towards an absorbing surface of one or more further absorbing elements. Solar receivers including heat-absorbing solid bodies configured in one or more of these manners will be further described with particular reference to FIGS. 3 to 5.

Figure 3:
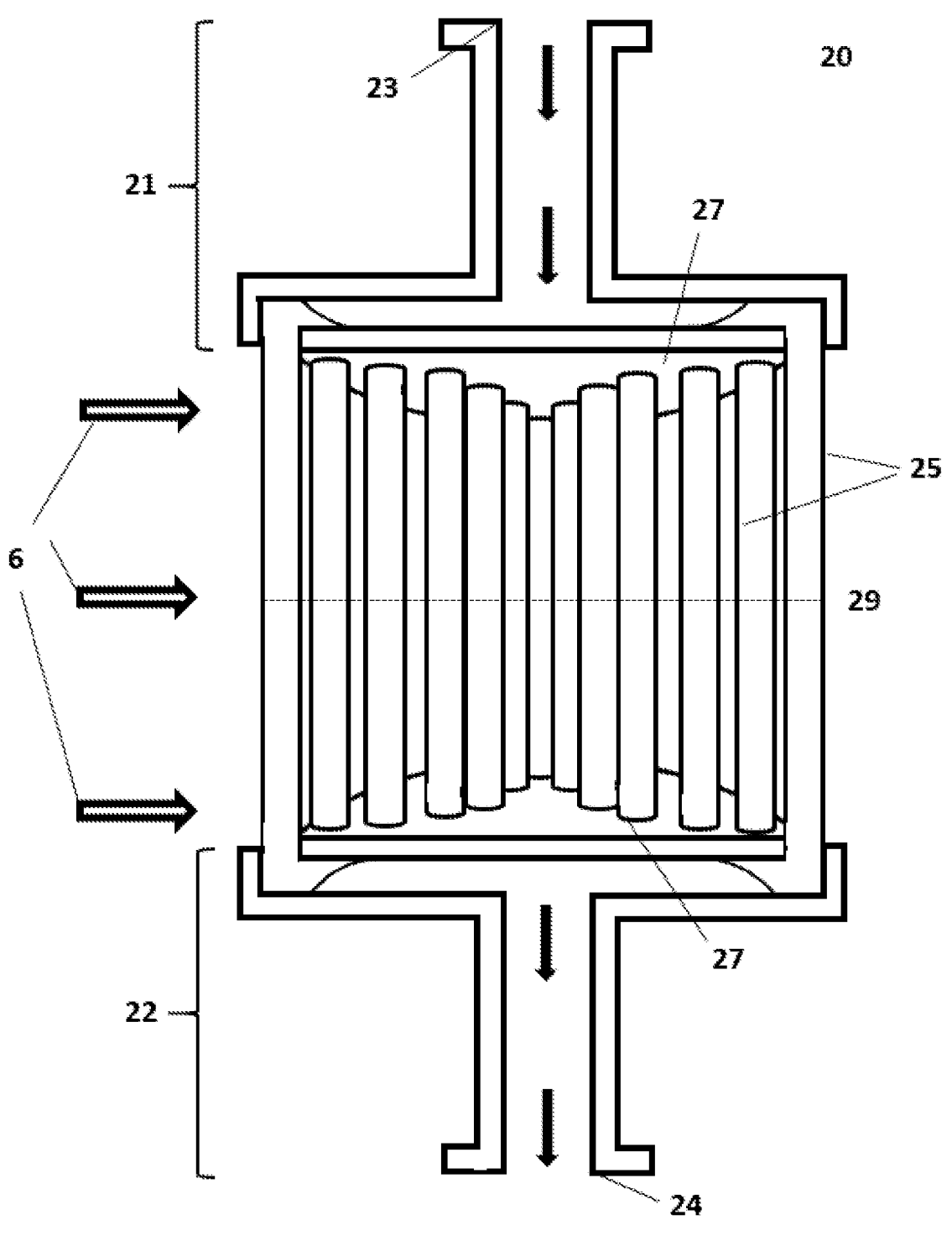
FIG. 3 is a cross-sectional side view of an embodiment of a solar receiver in accordance with the present invention.
Figure 4:
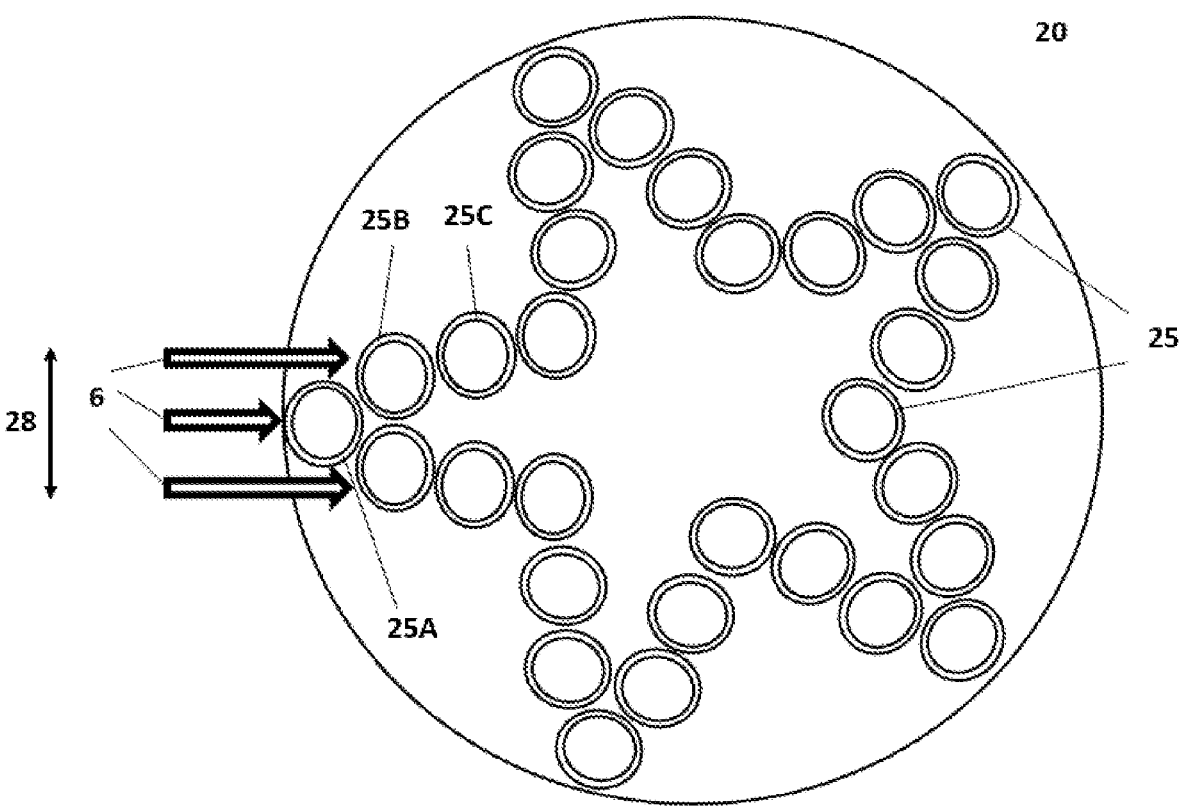
FIG. 4 is a top down cross-sectional view of the solar receiver of FIG. 3.

FIG. 3 shows a cross-sectional side view of a heat-absorbing solid body in the form of a rotor 20 with a plurality of conduits configured such that different conduits may be subjected to different quantities of incident solar radiation. The rotor 20 is formed from two body portions 21, 22 which are substantially discoidal in shape. The body portions 21, 22 are substantially hollow such that working fluid may flow into the first body portion 21 via inlet 23 in the first body portion and out of outlet 24 in the second body portion 22. Positioned between the first body portion 21 and the second body portion 22 are a plurality of conduits 25. The conduits 25 connect the first body portion 21 to the second body portion 22. The conduits are arranged substantially in a star shape upon the first body portion 21 and the second body portion 22 such the resulting configuration approximates a star-shaped cage between two discoidal bodies. Inlet 23 and outlet 24 extend out from the respective first and second body portions 21, 22 on the opposite side of each body portion from the side to which the conduits 25 are connected. The conduits 25 are substantially hollow and are in fluid communication with the hollow region of each of the first and second body portions 21, 22. In use, working fluid may therefore flow into the rotor via the inlet 23 into the hollow part of the first body portion 21, through the plurality of conduits 25 into the hollow part of the second body portion 22 and then out through the outlet 24. Solar radiation 6 may be directed towards the surface of one or more of the plurality of conduits 25. FIG. 4 is a top-down cross-sectional representation of the solar receiver of FIG. 3 along plane 29. As shown in FIG. 4, each conduit in each outer point of the star-shaped arrangement of conduits 25 will 'see' incident solar radiation to a different extent. For example, in the arrangement of FIG. 4, conduit 25A will be subjected to a greater proportion of incident solar radiation 6 of width 28 than conduit 25B, which in turn will experience a greater proportion of incident solar radiation than conduit 25C. Therefore, as the rotor 20 of FIGS. 3 and 4 is rotated, each conduit will be periodically exposed to solar radiation 6 and become heated, although to different extents. The time-averaged solar flux experienced by each conduit 25 is therefore different and/or uneven for any adjacent pair of conduits 25 as rotor 20 rotates.

Utilising the inner volume of the solar receiver, and/or positioning the absorbing elements of the solar receiver in positions that are not substantially towards the outer edges or circumference of the body portions allows for the inclusion of additional absorbing elements. The inclusion of additional absorbing elements may increase the surface area of the heat-absorbing solid body available to absorb incident solar radiation. Moreover, the inclusion of additional absorbing elements may increase the surface area of the heat-absorbing solid body in contact with one or more flows of working fluid to which heat is transferred, therefore increasing the rate at which energy may be carried away from the heat-absorbing solid body and increasing the cooling potential of the solar receiver. For a given flux of incident solar radiation, the energy absorbed by each individual absorbing element may therefore be decreased as the energy is absorbed across a greater surface area. However, some materials demonstrate improved absorptivity at low temperatures and maintaining a lower average temperature across the heat-absorbing solid body may lead to improvements in the efficient of absorption of solar radiation. These considerations, when combined with the potential for increased cooling efficiency may allow a solar receiver adopting these principles of design to operate at a higher concentration of incident solar radiation, c, without exceeding the thermal tolerance of the materials of construction.

Figure 5A:
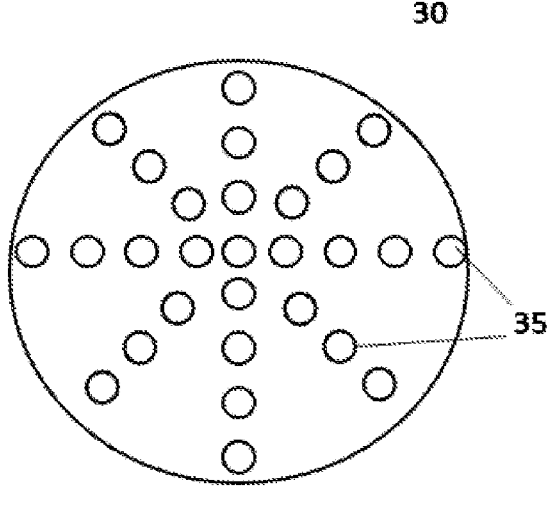
FIGS. 5A, 5B, 5C and 5D are top-down cross sectional views of various embodiments of rotor configurations in accordance with the present invention.
Figure 5B:
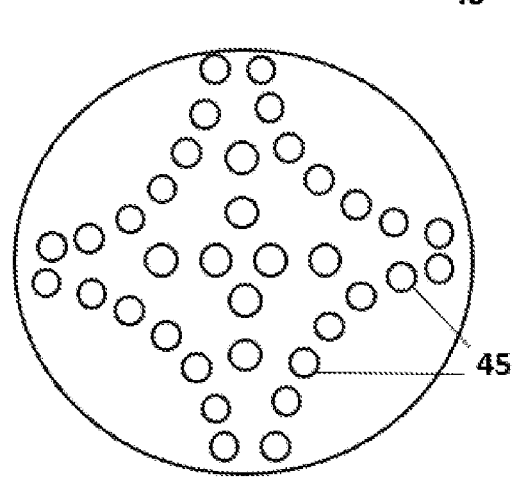
Figure 5C:
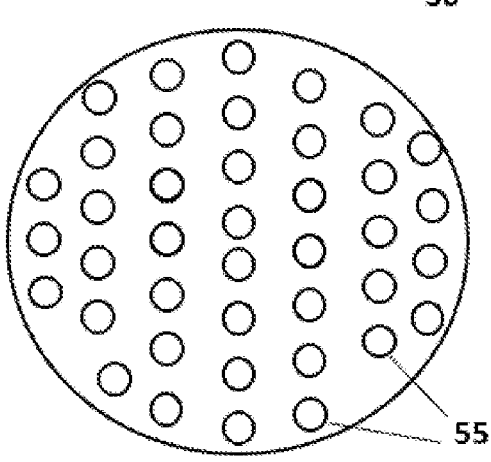
Figure 5D:
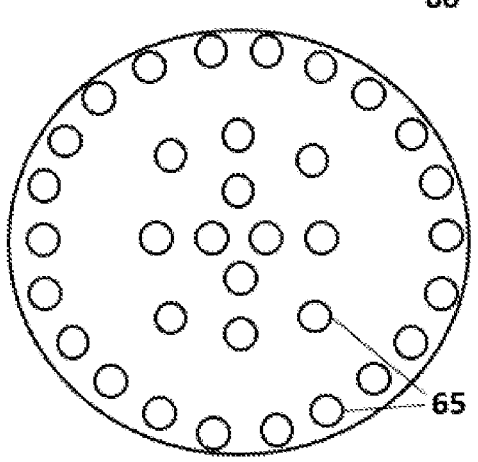

FIGS. 5A, 5B, 5C and 5D show three further top-down cross sectional rotor designs 40, 50, 60 which adopt these principles. The arrangement of FIG. 5A shows a variation of a star-shaped rotor design where the absorbing elements 35 are arranged such that rows of absorbing elements of a single absorbing element in width are arranged in to form an eight-point star. The arrangement of FIG. 5B shows a rotor configuration with four concave hemi-circular arrangements of absorbing elements 45 arranged around a cross-shaped arrangement of absorbing elements 45 towards the centre of the rotor body. The arrangement of FIG. 5C shows a rotor configuration with substantially parallel rows of absorbing elements 55 arranged across the rotor body. The arrangement of FIG. 5D shows a rotor with an arrangement of absorbing elements 65 arranged around the circumferential portion of the rotor body in a similar arrangement to that shown in FIGS. 1 and 2 but with additional absorbing elements arranged in the internal volume of the cage-like structure formed from the absorbing elements positioned around the circumference. The skilled person will appreciate that the absorbing elements of these configurations will be exposed to different quantities of incident solar radiation when the rotor is in use depending upon the position of the absorbing element relative to other absorbing elements forming the heat-absorbing solid body. One or more absorbing elements of each arrangement will occlude at least a portion of one or more other absorbing elements such that portions of some absorbing elements may be fully occluded such that these portions do not experience incident solar radiation when the rotor is in operation. A multitude of further configurations and arrangements of absorbing elements may be used to provide an arrangement with a large available surface area for absorption of incident solar radiation and/or for transfer of absorbed heat to working fluid flowing through or across the heat-absorbing solid body.

The rate and/or efficiency of heat transfer between the heated portions of the heat-absorbing solid body and the working fluid is generally related to the contact surface area of heated material in contact with the flow of working fluid. High rates of heat transfer generally require higher surface areas. In designs where a the heat-absorbing solid body is a rotor which includes multiple absorbing elements, increasing the number of absorbing elements in a fixed size of rotor provides one means by which this surface area may be increased. However, an increased number of absorbers or conduits in a fixed area generally involves the use of smaller absorbing elements. Where the absorbing elements are conduits, smaller conduits will generally increase pressure losses or pressure drop throughout the working fluid system. Increasing the diameter of a cylindrical conduit decreases pressure drop exponentially and so small decreases in the size of conduits may result in significant increases in pressure drop. Increased pressure loss, in turn, reduces the efficiency of the solar receiver by increasing the work required to flow working fluid through the receiver. Arrangements of heat-absorbing solid body utilising a greater proportion of the volume of the solar receiver such as those in FIGS. 3 to 5 allow more absorbing elements of larger diameter to be packed together. Such heat-absorbing solid bodies may therefore have cross sections configured to promote contact between the heated portions of the heat-absorbing solid body and the working fluid and to reduce pressure drop throughout the working fluid system.

Under normal operating conditions, the heat-absorbing solid body may be exposed to high working temperatures. In an example, the heat-absorbing solid body may be exposed to temperatures in excess of 2500° C., depending upon the heat concentration factor to be adopted. Consequently, the heat-absorbing solid body may be at least partially formed from a refractive material capable of withstanding high temperatures. The heat-absorbing solid body may include a material with a melting point in excess of, or equal to, 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C., or more than 2500° C. Preferably, the heat-absorbing solid body may comprise a material with a melting point in excess of 1500° C. More preferably, the heat-absorbing solid body may include a material with a melting point in excess of 2000° C. In concentrated solar applications involving high values of light concentration, it may be particularly advantageous to form the heat-absorbing solid body from a material with a melting point in excess of 2500° C. It may also be advantageous to utilise a material which is capable of absorbing light across a large proportion of the ultraviolet, visible, and/or infrared spectrum. A material which also possesses a high refractive index may promote the absorption of solar energy at the surface of the heat-absorbing solid body and thus be particularly beneficial. Consequently, the heat-absorbing solid body may be formed from a material with a refractive index greater than or equal to 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95 1.0, 1.1, 1.2, 1.25, 1.3, 1.4, 1.5, 1.6, 1.7, 1.75, 1.8, 1.9, or 2. Preferably, the heat-absorbing solid body material may have a refractive index greater than 1. More preferably, the heat-absorbing solid body material may have a refractive index greater than 1.5. It may be advantageous to utilise a material with a refractive index greater than 2. One or more materials used to form the heat-absorbing solid body may be selected such that they have a melting point and a refractive index selected from the melting points and refractive indexes listed above. For example, a suitable material may have a melting point of 1700° C. and a refractive index of 1.3. In another example, one or more materials may be selected such that they have a melting point of 2300° C. and a refractive index of 1.9, Suitable materials may include ceramics, high refractive index polymers (HRIPs), metals, metal oxides, alloys, inorganic compounds, thermally tolerant organic compounds, and any other suitable material alone or in combination. It may be particularly advantageous to form the heat-absorbing solid body from steel, steel alloys, ceramics, zirconium, molybdenum, or any material with suitable properties to approximate a black body. Materials should also be selected with sufficient stress tolerances to ensure that the heat-absorbing solid body is capable of withstanding the forces acting upon it during movement and/or rotation. The material used to form the heat-absorbing solid body may advantageously include a material with a high solar absorptance. For example, the materials may have a solar absorptance in excess of, or equal to, 0.5, 0.6, 0.7, 0.8. 0.9, 0.95, 0.96, 0.97, 0.98, or 0.99.

The heat-absorbing solid body or part of the heat-absorbing solid body upon which solar radiation is focused may be formed from, and/or at least partly coated with, a high melting point refractive material. The heat-absorbing solid body may therefore include one or more coatings. The coating may be formed, at least in part, from one or more materials with the melting point and/or refractive index characteristics identified herein as suitable for formation of the heat-absorbing solid body. Consequently, the coating may include and/or be formed from a material with a melting point in excess of, or equal to, 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C., or more than 2500° C. The coating may additionally, or alternatively, include and/or be formed from a material with a refractive index greater than or equal to 0.05, 0.10, 0.15, 0.20, 0.25, 0.30, 0.35, 0.40, 0.45, 0.50, 0.55, 0.60, 0.65, 0.70, 0.75, 0.80, 0.90, 0.95 1.0, 1.1, 1.2, 1.25, 1.3, 1.4, 1.5, 1.6, 1.7, 1.75, 1.8, 1.9, or 2. The coating may have a melting point characteristic a refractive index characteristic, and/or a solar absorptance characteristic as described herein. In an example, at least a portion of one or a plurality of the conduits in the rotors of FIGS. 1 to 4 may be coated with one or more materials. Generally, the one or more surfaces of the heat-absorbing solid body upon which solar radiation will be incident may formed from a material selected to impart beneficial properties to the heat-absorbing solid body, as desired. The material or coating may extend around the outer periphery of the heat-absorbing solid body, extend across the entire outer surface of the heat-absorbing solid body, or cover selected portions of the heat-absorbing solid body, as necessary. The desirable properties for the material or coating may include the properties of high refractive index, high solar absorptance, selective solar absorptance, high thermal tolerances and mechanical strength. In particular, it is desirable to utilise a material or coating with a high solar absorptance. It is further desirable to utilise a material or coating with high thermal tolerance such that the material does not degrade or become damaged under high concentrations of solar radiation. It is yet further desirable to utilise a material or coating with high mechanical strength such that the material does not become damaged or degrade due to movement of the material or coating at high speeds during use of the solar flux device. In exemplary embodiments, the material and/or coating will include a material that approximates a black body absorber to maximise the proportion of solar radiation absorbed. For example, a material and/or coating may have a solar absorptance in excess of, or equal to, 0.5, 0.6, 0.7, 0.8. 0.9, 0.06, 0.97, 0.98, or 0.99. Preferably the material and/or coating may have a solar absorptance in excess of 0.8. More preferably, the material and/or coating may have a solar absorptance in excess of 0.90 or 0.95. In these or other examples, the material and/or coating may have a melting point in excess of 1000° C. Preferably, the material and/or coating may have a melting point in excess of 1200° C. More preferably, the material and/or coating may have a melting point in excess of 1300° C. Materials with melting points in excess of 1500° C. may also be used. Suitable materials for use in the heat-absorbing solid body or coating include ceramics, cermets, zirconia, zirconium species, tantalum species, borosilicates, silicon species, carbon-based materials, metals, metal oxides, alloys, and any other suitable material alone or in combination. Where a coating material is used, a base material such as stainless steel, or a nickel-chromium alloy which may itself have an unsuitable solar absorptance may support a coating material of suitable absorptive properties. It may be particularly advantageous to form a coating from: thermally tolerant black paint (e.g. Pyromark 2500 available from Tempil Corporation); zirconium bromide; zirconium oxide, and/or its zirconium cermet; chromium oxide, and/or its nickel or chromium cermets; aluminium oxide, and/or its nickel, molybdenum and tungsten cermets; aluminium nitride, and/or its titanium cermet; silicon carbide; or any combination thereof. Materials used to form one or more coatings may also be used to form at least part of the heat-absorbing solid body itself. Similarly, materials used to form the heat-absorbing solid body may be used to form at least part of a coating on the heat-absorbing solid body in examples where a material different to the coating material is used to form the heat-absorbing solid body.

The properties of some suitable materials that may be used to form the heat-absorbing solid body or a coating thereon are provided below in Table 1.

TABLE 1

| Properties of materials for use with a solar receiver | | | |
|---|---|---|---|
| Material | Solar Absorptance | IR Emittance | Melting Point |
| Pyromark 2500 | 0.97 | 0.9 at 1000° C. | 1000-2000° C. |
| ZrB$_2$ | 0.93 | 0.09 at 102° C. | ~3200° C. |
| Zr:ZrO$_2$ | 0.96 | 0.05 at 80° C. | ~2700° C. |
| Cr:Cr$_2$O$_3$ | 0.868 | 0.088 at 121° C. | ~2400° C. |
| Ni:CrO$_x$ | 0.961 | 0.022 at 100° C. | ~1400° C. |
| SiC | ≥0.9 | — | ~2700° C. |
| Ni:Al$_2$O$_3$ | 0.94 | 0.18 at 100° C. | ~2000° C. |
| Mo:Al$_2$O$_3$ | 0.97 | 0.17 at 350° C. | ~2000° C. |
| W—Ni:Al$_2$O$_3$ | 0.9 | 0.15 at 500° C. | <2000° C. |
| W:Al$_2$O$_3$ | 0.95 | 0.106 at 400° C. | <2000° C. |
| Ti:AlN | 0.95 | 0.07 at 82° C. | <1000° C. |

In embodiments where the heat-absorbing solid body is coated, the coating may be any suitable thickness. For example, the coating may have a thickness between about 0.1% to about 99% of the diameter, width, length or other dimension of the heat-absorbing solid body. Preferably, the coating will have a thickness of between about 1% and 75% of the thickness of the heat-absorbing solid body. Advantageously, the coating may cover, or at least partly cover, 2% to 50% of the length, width or diameter of the heat-absorbing solid body.

A heat-absorbing solid body which includes a coating may have a body formed from materials that would otherwise be unsuitable for use in an uncoated heat-absorbing solid body, such as lead, or materials with unsuitable optical properties. In such situations, the coating provides the thermal and optical functions necessary for the heat-absorbing solid body to absorb and transfer heat, while also protecting the body of the heat-absorbing solid body from damage resulting from exposure to high concentrations of solar radiation and high temperatures in implementations where materials with a poor thermal tolerance are used. It may be possible to separate or detach the heat-absorbing solid body coating from the body of the heat-absorbing solid body to allow repair or replacement of one or both components in isolation. For example, the coating material may be present in the form of one or more removable plates, platelets or tiles.

The material used to form an absorbing element of the heat-absorbing solid body and/or a coating thereon may therefore be selected such that a heat-absorbing solid body where different portions of the absorbing surface experience different time-averaged solar flux may exploit the differences in incident energy upon each portion of the heat-absorbing solid body. The solar receiver may therefore be configured such that the surface of at least two absorbing elements that absorb incident solar radiation are formed from materials with different solar absorption and/or reflection properties For example, a portion of the heat-absorbing solid body upon which a greater quantity of solar radiation is incident may be formed from a material with a different absorptivity than a portion of the heat-absorbing solid body upon which a lesser quantity of solar radiation is incident. The differences in absorptivity may therefore allow the maximum temperature of each absorbing portion to be maintained within a desired temperature range to prevent the absorber from overheating. With reference to the example of FIG. 4, conduit 25A may experience a greater solar flux than that experienced by conduit 25B. Conduit 25A may therefore be formed from, or at least partially coated with, a material with a lower absorptivity than conduit 25B. In a solar receiver where the maximum value of c is known, the incident energy upon the absorber, the absorptivity of the absorbing material, the heat capacity of the material, and the rate of heat transfer from the heated material to the working fluid may be used to determine the maximum operating temperature of different absorbing elements on a heat-absorbing solid body which may, in turn, inform the selection of materials for use in the solar receiver. The solar receiver may therefore operate at the highest possible c values while reducing the risk that the portions of the absorber experiencing the greatest incident energy will overheat. Continuing with the example of FIG. 4, conduits 25B and 25C may be formed from, or coated with, materials with a greater absorptivity than conduit 25A. As conduits 25B and 25C will each be subjected to less incident solar radiation than conduit 25A, conduit 25B and conduit 25C can therefore absorb a greater proportion of energy incident upon the respective conduit than conduit 25A without risk of overheating. Additionally, or alternatively, the absorbing portion of the heat-absorbing solid body may be formed from one or more materials with different thermal properties.

For example, returning to the example of FIG. 4, conduit 25A may be formed from a material which facilitates a high rate of transfer of absorbed heat from the absorbing material to the working fluid flowing through the conduit. Forming at least part of the absorber from such a material will allow heat to be carried away by the working fluid at a higher rate, therefore maintaining the temperature of the absorber within a desired range. Conduits 25B and 25C which receive less incident solar radiation need not necessarily be formed from a material that allows rapid heat transfer to the working fluid as tubes 25B and 25C may not be heated to the same extent as tube 25A in use.

The use of materials or coatings with selective absorption properties may also be advantageous. Solar radiation spans wavelengths from approximately 100 nm to 1 mm and materials may be selected to absorb only part, parts or all of this wavelength range of radiation. Materials with selective absorption properties may also have selective or limited emissivity characteristics. Therefore, at least a portion of the heat-absorbing solid body may include a selective absorption material that selectively absorbs part of the wavelength spectrum of incident solar radiation. In an example, a material with a high solar absorptivity throughout at least part of the solar radiation wavelength spectrum may be a poor emitter of infra-red radiation which would consequently limited radiative losses from the material follow absorption of solar radiation. Materials used to form the heat-absorbing portions of the receiver and/or a coating thereon may therefore be selected to absorb a high proportion of incident solar radiation and retain the absorbed solar radiation as heat with only limited emissivity-related losses. Materials that may provide high absorptivity and low emissivity include tungsten, semiconductor-metals, metal-dielectric stacks or composites, crystalline structures, metamaterials, and the like. In some implementations, different absorbing surfaces or different portions of an absorbing surface of the heat-absorbing solid body may formed from or coating with materials with different absorptivity, selectivity and/or emissivity. In this manner, the surface of an absorber may be configured to promote optimal absorption of incident solar radiation such that heat energy is both efficiently absorbed and/or efficiently transferred to the working fluid following absorption.

Figure 6C:
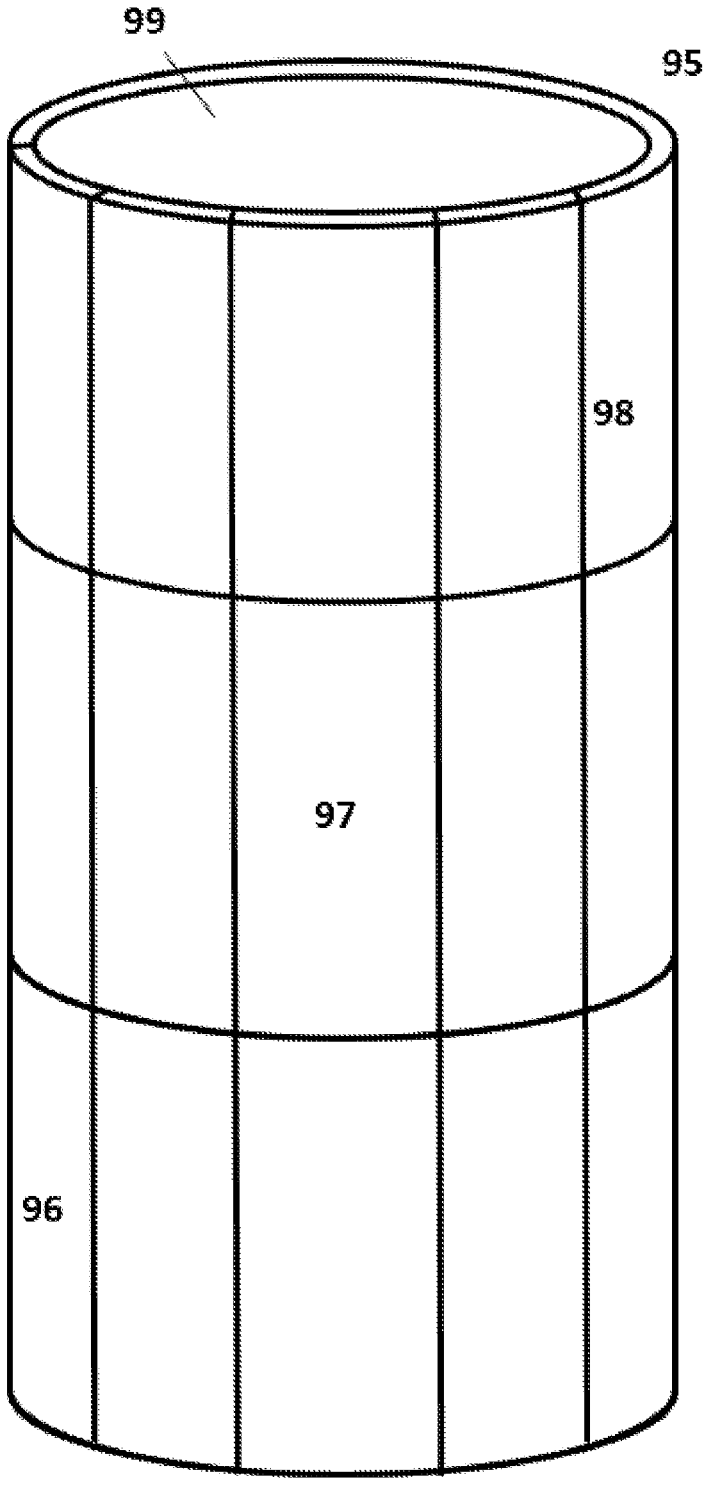

In an extension of these principles, different portions of an individual absorbing element of the heat-absorbing solid body may be formed, at least in part, from different materials with different absorption, reflectivity, emissivity, mechanical strength, thermal tolerance, and/or any other suitable property. At least one absorbing element of the heat-absorbing solid body may therefore be formed from a plurality of materials such that the absorbing surface of the absorbing elements has different solar absorption and/or reflection properties across a surface area upon which solar radiation is incident in use. FIGS. 6A, 6B, and 6C show some examples of configurations that may utilise different materials to form a conduit or absorber. FIG. 6A shows a cylindrical conduit 75 with internal fluid flowpath 79 running therethrough. The conduit 75 has three cylindrical sub-sections sections 76, 77, 78 which are stacked to form conduit 75 with each cylindrical sub-section containing a portion of the fluid flowpath 79. Any two sub-section 76, 77, 78, or each sub-section may be formed from materials with different properties. In an example, cylindrical sub-section 77 may, in use, be subjected to a greater incident solar flux than cylindrical sections 76 or 78. The absorptance and thermal tolerance of the material used to form sub-section 77 may therefore be selected to differ from that of sub-section

76 or 78, respectively. In another example the cylindrical sub-sections may be formed from materials such that the absorptance of the material increases, decreases, or otherwise varies along the flow direction of fluid flowing through fluid flowpath 79 in use. Variation of material properties along the flowpath may allow optimisation of one or more characteristics of the solar receiver. For example, if it is assumed that fluid flows through the conduit of FIG. 6A from cylindrical sub-section 76, to cylindrical sub-section 78, the material forming the conduit in section 76 closest to the fluid inlet may be selected to have high absorptance and heat transfer properties such that the portion of the absorber or conduit storing the greatest portion of heat energy is in contact with the coolest portion of working fluid as it enters the flowpath, therefore promoting the maximum transfer of heat energy away from the portion of the absorber with the greatest stored heat energy and into the working fluid. Alternatively, the materials forming the cylindrical sub-sections 76, 77, 78 of conduit 75 may be selected such that the absorptance increases along the direction of fluid flow such that the working fluid is in contact with sub-sections of the conduit of gradually increasing temperature as it flows through the conduit. FIG. 6B shows a cylindrical conduit 85 with a fluid flowpath 89 running therethrough. In contrast to the arrangement of FIG. 6A, the conduit of FIG. 6B is formed from sub-sections 86, 87, 88 each forming a different portion of the circumference of the cylindrical conduit 85. Each sub-section, or any two sub-sections of conduit 85 may be formed from materials with different properties. In an example, in a rotor configuration where greater quantities of solar radiation will be directed on to sub-section 87 than on to the adjacent sub-sections 86, 88, the sub-section 87 with the greatest time-averaged incident solar flux may be formed from a material with a high thermal tolerance. In some rotor configurations, portions of an absorbing element may not be subjected to significant quantities of incident solar radiation. This may be particularly the case where multiple absorbing elements are positioned in close proximity such that one absorbing element occludes a portion of another. The portions of the absorbing elements that will not be subjected to high concentrations of incident solar radiation may therefore be formed from a material with poor absorptive properties but one or more further desirable properties. Returning to the example of FIG. 6B, if sub-section 86 and sub-section 87 are not exposed directly to solar radiation in use, then they may be formed from materials with a high thermal conductivity such that heat energy stored in sub-section 87 is carried around the circumference of the conduit to both reduce the maximum temperature experienced by sub-section 87 while promoting transfer of heat to the working fluid by distributing heat energy around a greater surface area of the conduit in contact with the working fluid.

The principles of FIG. 6A and FIG. 6B may be combined to provide an absorber or conduit with materials of different properties both around the circumference of the absorber or conduit and along the fluid flowpath of the conduit, where present. FIG. 6C shows a conduit 95 with such an arrangement. Conduit 95 encloses internal 20 flowpath 99 with different portions of the conduit walls formed from sub-sections 96, 97, 98. Any number of sub-sections may be formed from different materials to optimise the properties of the conduit. For example, sub-section 97 may be formed from a material with greater absorptance, greater thermal tolerance, lower emissivity or lower reflectivity than the materials used to form sub-section 96 or sub-section 98. More 25 complex arrangements of materials than those shown in FIGS. 6A, 6B and 6C may be used. For example, the absorbing elements may include, be formed from, or coated with any number of sub-sections of materials. Although only three sub-sections are shown in the example of conduit 75 of FIG. 6B, any number of sub-sections could be used in the absorbing elements exemplified by FIGS. 6A, 6B and 6C. Moreover, absorbers or conduits may include, be formed from, or coated with materials with gradients of changing properties such that no clear or distinct demarcation between materials with different properties is apparent. The skilled person, with the benefit of this disclosure will be able to identify a suitable arrangement of materials to optimise the desired properties of the absorbing element including, but not limited to optimisation for efficiency of absorption, efficiency of heat transfer to working fluid, and the like. Therefore, in rotor configurations where absorbing elements or portions of the absorbing elements experience different time-averaged solar flux, the heat-absorbing solid body may be configured to advantageously exploit the different solar flux experienced by each portion of an absorbing element of the heat-absorbing solid body by selecting different materials to form different portions of the absorber or conduit.

Although FIGS. 6A, 6B and 6C are described primarily with reference to conduits with working fluid flowing therethrough, the principles described in relation to these figures are equally applicable to absorbing elements with no internal fluid flowpath such as those which may be used in a solar receiver where working fluid is passed across the surface of an absorber to facilitate heat transfer. Therefore, in the examples of FIGS. 6A to 6B, the fluid flowpaths 79, 89, 99 may instead represent solid material cores with the sub-sections 76, 77, 78, 86, 87, 88, 96, 97, 98 representing an absorbing material or coating positioned around a solid material core.

For the avoidance of doubt, in solar receiver designs including multiple absorbing elements, each absorbing element, or any two absorbing elements may be formed from different materials, be formed from materials arranged in different configurations, or any combination thereof. In this manner, the principles described in respect of FIGS. 6A to 6C may be combined with the principles of solar receiver design described in respect of FIGS. 3 to 5. In an example, conduit 25A of FIG. 4 may be configured with sub-sections arranged both along the length of the conduit and around the circumference of the conduit with various properties as shown and described in respect of conduit 90 of FIG. 6C. In this example, conduit 25B and/or conduit 25C may be configured with only circumferential sub-sections such as those shown and described in respect of FIG. 6B.

The heat-absorbing solid body may further include a thermally insulating material. The insulation may be positioned to protect one or more components of the solar receiver from experiencing excessive temperatures. To this purpose, the thermally insulating material may be present as a layer between any two components of the solar receiver. For example, the insulation may be positioned between the one or more absorbing surfaces of the heat-absorbing solid body and the central rotational axle, where present. The thermally insulating material may additionally, or alternatively, be positioned to protect particular components from high temperatures. When using a coated heat-absorbing solid body, the insulation may advantageously be positioned between the coating and the body of the heat-absorbing solid body. Additionally, or alternatively, the insulating material may be present in the form of plates or tiles. The plates or tiles may be of the same or different dimension to plates or tiles used on the absorbing portions of the heat-absorbing solid body, where present. The plates and tiles of insulating material may interlock with each other, and/or plates or tiles of absorbing or coating material, where present. In general, the insulating material may prevent the passage of heat from the surfaces of the heat-absorbing solid body that absorb solar radiation and components of the solar receiver with a lower thermal tolerance such as the movement and/or rotational means associated with the heat-absorbing solid body. The insulation may therefore prevent loss of heat away from the surface of the heat-absorbing solid body and provides the additional benefit of protecting the solar receiver components from degradation due to exposure to excessive temperatures. The insulation may be any suitable thickness. For example, the insulation may have a thickness between about 0.1% to about 200% of the diameter, width, length or dimension of the heat-absorbing solid body. Preferably, the insulation will have a thickness of between about 1% and 50% of the heat-absorbing solid body dimension. Advantageously, the insulation may comprise 2% to 40% of a diameter of the heat-absorbing solid body. Suitable insulating materials include ceramics, refractory materials, reinforced carbon materials, insulating thermally tolerant polymers, and combinations thereof.

The heat-absorbing solid body may be configured to move or rotate at high speeds. Where the heat-absorbing solid body is a rotor, the rotor may be configured to rotate as speeds of between 0.1 revolutions per minute (rpm) and 20,000 rpm. Preferably, the rotor may be configured to rotate at speeds of between 25 rpm and 10,000 rpm. More preferably, the rotor may be configured to rotate at between speeds of 60 rpm and 6,000 rpm. In general, a heat-absorbing solid rotor that occupies a volume of approximately cylindrical shape will rotate around an axis of rotation that may run through the centre, or substantially through the centre point of the circular cross section of the approximately cylindrical volume occupied by the rotor. In the examples of FIGS. 1 to 5, the axis of rotation runs through the centre of the inlet 3, 23 and outlet 4, 24 and through the centre point of the circular faces of the discoidal body portions 1, 21, 2, 22. In operation, the speed of movement of the heat-absorbing solid body may be manually adjustable by an operator. Advantageously, the movement speed of the heat-absorbing solid body may additionally, or independently, be controlled automatically in response to measurements of incident energy, system temperature or any other suitable measurement. For example, the rotational speed of a rotor may be increased in response to a higher density of incident solar energy upon the rotor and decreased in response to a decrease in solar energy incident upon the rotor, for example to maintain an approximately constant maximum temperature experienced by any part of the rotor. Alternatively, or additionally, the rotational speed of the rotor may be increased or decreased in response to an increase or decrease in temperature of one or more components of the solar receiver. In practice, the speed of the rotor may be adjusted in response to one or more measurements made by one or more sensors communicably coupled to a control system. Movement of the heat-absorbing solid body at high speeds reduces the duration of time across which the heat-absorbing solid body is exposed to high concentrations of solar radiation and allows management of temperature and limitation of the material's thermal degradation, as required.

The coated, or uncoated, surfaces of the heat-absorbing solid body upon which solar radiation is to be received may be substantially smooth. Smooth surfaces may reduce frictional resistance that would inhibit the movement of the heat-absorbing solid body. However, substantially smooth surfaces may promote reflection of incident solar radiation depending on the material at the surface of the absorbing portion of the heat-absorbing solid body. It may therefore be advantageous for the absorbing surfaces of the heat-absorbing body to be rough, substantially non-smooth or of complex topography. For example, the absorbing surfaces of the heat-absorbing solid body may be porous, pitted, contoured, or of otherwise irregular unsmooth topography. Irregular surfaces may be configured to promote favourable interactions between the surface and the incident solar radiation. For example, pitted surfaces may act to trap light by encouraging diffuse reflection within the surface topography itself, resulting in any reflected light being directed towards other areas of the surface of the heat-absorbing solid body. A porous surface may have a greater surface area than a comparable smooth surface, thus allowing the high concentrations of incident light to be absorbed across a larger effective surface area. Heat energy present across a larger surface may subsequently be transferred more efficiently to a working fluid passing across the surface of the heat-absorbing solid body. The surface topography may be specifically configured to promote the transfer of heat from the surface of the heat-absorbing solid body to a working fluid by including fins, radiative elements, or similar structural features, across the surface of the heat-absorbing solid body. For example, where a porous material is used, the working fluid may advantageously be passed through the pores of the heat-absorbing solid body to improve transfer of heat from the surface of the heat-absorbing solid body to the working fluid. The surface properties and/or topography of the heat-absorbing solid body may be further controlled by modifying the morphology of the materials, and more particularly the surface morphology of the material, used in the absorbing portion of the heat-absorbing solid body. In an example, laser etching techniques such as direct femtosecond laser processing may be used to configure the surface structure of the heat-absorbing solid body. Such techniques may form nanometre scale structures on the surface of the absorber that increase the absorptivity or reduce the emissivity of the absorbing material. Other techniques such as abrasion techniques, water etching, gas or vapour deposition, particle deposition, or any other suitable technique may also be used to modify the surface properties of the absorber. Modification of the surface properties of materials in this manner may allow the absorptive selectivity, such as the range of wavelengths of solar radiation which are absorbed by a material, to be controlled. At least one absorbing element of the heat-absorbing solid body may therefore have a surface topography, morphology, or texture different from the surface topography, morphology, or texture of another of the plurality of absorbing elements such that the absorbing elements have different solar absorption and/or reflection properties. The surface topography, morphology, or texture of different sub-sections of an individual absorbing element, such as those exemplified in FIGS. 6A, 6B, and 6C may also be differentiated to optimise the various properties and behaviour of a single absorbing element.

The absorbing elements of the heat-absorbing solid body may be shaped to influence or promote absorption of incident solar radiation, efficiency of heat transfer to the working fluid flowing proximate to or through the heat-absorbing solid body, and/or to direct any reflected solar radiation to another absorbing surface in the solar receiver.

FIGS. 7A, 7B, 7C and 7D show cross sections of various absorbing element designs that may be used in a solar receiver such as the rotor designs shown in FIGS. 1 to Although cylindrical conduits with substantially circular cross sections such as the conduit 110 shown in FIG. 7A are known to be advantageous due to the capability of a circular cross section to withstand high pressures and favourable internal flow dynamics, the use of absorbing elements of non-circular cross section may be advantageous. FIG. 7B shows a conduit 120 of elliptical cross section. Solar radiation 6 incident upon the absorbing surface of conduit 120 may be partially reflected as reflected solar radiation 116. The angle 117 at which reflected solar radiation 116 is reflected may depend, at least in part, upon the angle at which incident solar radiation 6 interacts with the surface of the conduit 120. As shown in FIGS. 7A and 7B, the cross-sectional shape of the conduit and/or its topography may therefore influence the angle 117 at which incident solar radiation 6 is reflected. It may therefore be advantageous to adopt one or more absorbing elements of non-circular cross-section to promote the reflection of solar radiation towards other absorbing surfaces of the rotor. FIG. 7C shows a conduit 130 with a pointed cross-sectional portion protruding from a conduit of otherwise circular cross-section. The use of an absorbing element with a cross section approximating that of FIG. 7C may both influence the angle 117 at which incident solar radiation 6 is reflected as reflected solar radiation 116 and may additionally, or alternatively, increase the surface area available to absorb incident solar radiation or to transfer absorbed heat to working fluid. This increase may be appreciated relative to absorbing elements with one or more equivalent cross-sectional dimensions but a different shape such as those in FIGS. 7A and 7B. Other cross-sectional shapes or topographies may be utilised depending on the desired functionality of the solar receiver. In an example, the conduit 140 shown in FIG. 7D with a bullet-shaped cross section may facilitate closer packing of absorbers or conduits in solar receiver designs where a plurality of such absorbers or conduits are closely adjacent. Closer packing of absorbers or conduits may increase the total surface area available to absorb incident solar radiation. Is it therefore to be appreciated that the angle at which incident solar radiation is reflected, the surface area available for absorption of solar radiation or transfer of heat to working fluid, the number of absorbers or conduits which may be arranged in a given volume of a solar receiver, or any other relevant property of absorber or solar receiver may be influenced by modifying the cross-sectional shape, area, and/or topography of one or more absorbers or conduits of a solar receiver. The absorbing elements of the heat-absorbing solid body, the cross-section of the absorbing elements, and/or the perimeter shape of a cross-section of at least one of the absorbing elements in a plane coincident with incident solar radiation in use may therefore be configured to promote transfer of heat to the working fluid from the heated portions of the at least one of the absorbing elements, promote reflection of reflected incident solar radiation reflected from the at least one of the absorbing elements to another absorbing element, and/or promote absorption of incident solar radiation as heat when the solar receiver is in use. Furthermore, the ratio of a first dimension of a cross-section of an absorbing element and a second dimension of a cross-section of an absorbing element may therefore be selected to promote transfer of heat to the working fluid from the heated portions of the at least one of the absorbing elements, promote reflection of reflected incident solar radiation reflected from the at least one of the absorbing elements to another absorbing element, and/or promote absorption of incident solar radiation as heat when the solar receiver is in use. The cross-section of an absorbing element may be circular, elliptical in shape, tear-shaped, pear-shaped, bullet-shaped, or irregular in shape In solar receivers that include a plurality of absorbing elements, such as those shown in FIGS. 1 to 5, any two absorbing elements may be of a different cross-sectional area or topography to optimise the pathing of reflected light through the receiver, the total surface area of the absorber available to absorb solar radiation, and/or the total surface area of heated material available to transfer heat to the working fluid. Absorbing elements of different cross-sectional shapes and surface areas may therefore be used in combination to increase the efficiency of the solar receiver. The skilled person will further appreciate, with the benefit of this disclosure, that conduits of various cross-sectional shapes may be used in conjunction with the conduits formed from one or more materials of different properties shown and described in relation to FIGS. 6A, 5B and 6C. Although FIGS. 7A, 7B, 7C and 7D are generally described in relation to one or more conduits, the cross-sectional shapes and resultant functions thereof are equally applicable to absorbers without a flowpath therethrough. In these examples, absorbing elements with cross sections approximating the conduits of FIGS. 7A to 7D may instead include a solid core of any suitable cross section with an optional coating thereon. Solar receivers using such absorbers may flow working fluid across one or more heated surfaces of the absorbers to transfer heat to the working fluid.

In general use, the solar radiation incident upon the heat-absorbing solid body is directed towards the heat-absorbing solid body via solar flux optics and/or one or more optical arrangements positioned in proximity to the heat-absorbing solid body. The optical arrangements direct the solar radiation on to a surface of the heat-absorbing solid body which absorbs at least part of the incident solar radiation as heat energy. The working fluid flows through, or in proximity to, the absorbing surface of the heat-absorbing solid body. The working fluid will generally be lower in temperature than the absorbing portions of the heat-absorbing solid body, and consequently, heat will be transferred from the surface of the heat-absorbing solid body to the working fluid. The one or more optical arrangement may be any suitable configuration of optical components that allow the solar radiation to be directed towards, and focused upon, the desired surface of the heat-absorbing solid body. For example, the optical arrangement may include one or more mirrors, lenses, prisms, heliostats, reflective surfaces or any other suitable optical component. It may be advantageous to utilise compound parabolic concentrators (CPCs) as at least a component of one or more of the optical arrangements. The optical arrangement may additionally, or alternatively, comprise one or more light tubes. The solar receiver or the wider system in which the solar receiver is a part may include any number of optical arrangements. Where a plurality of optical arrangements are present, it may be advantageous to position the optical arrangements of the solar receiver around the heat-absorbing solid body such that the distances and angles between the heat-absorbing solid body and each proximal optical component are generally equivalent. Spacing the optical arrangements in such a manner may allow the one or more surfaces of the heat-absorbing solid body to be heated consistently as the heat-absorbing solid body moves, provided a comparable concentration of solar radiation is passed via each of the plurality of optical arrangements. In solar receivers including a plurality of optical arrangements, the optical arrangements may be configured to each focus solar radiation onto different portions of the surface of the heat-absorbing solid body of similar or different surface areas, as required. In solar receivers where the heat-absorbing solid body is at least partly contained within a housing, the solar radiation from the one or more optical arrangements may be directed through at least one aperture in the housing on to the absorbing portion of the heat-absorbing solid body. The aperture may include a lens or optical component configured to direct the light passing through the aperture towards a specific position on the surface of the heat-absorbing solid body. Directing the solar radiation to specific areas of the heat-absorbing solid body surface may allow the light to be converted to heat in the regions of the heat-absorbing solid body where, subsequently, the most efficient transfer to the working fluid takes place. Some configurations may allow for the transfer of light directly from solar flux optics to the heat-absorbing solid body without the use of intermediate optical arrangements. In these examples, light incident upon a solar flux optic such as a CPC may be directed onto the heat-absorbing solid body directly.

One advantageous configuration provides optical arrangements that direct all incident light, substantially all incident light, or the major proportion of incident light on to the moving heat-absorbing solid. In such a configuration, the only surfaces of the solar receiver which will be heated for eventual heat-exchange with a working fluid will be part of the moving heat-absorbing solid body. In this example, no light is directed on to stationary or immobile solids forming the solar receiver. This arrangement prevents incident light with a high c value from heating a stationary solid beyond the point of thermal tolerance. Therefore, in general, the solar receivers disclosed herein focus substantially all incident light on to the moving heat-absorbing solid body and prevent, or substantially minimise the absorption of light by stationary solid material forming the receiver. In an example, the solar receiver will be configured to only heat the moving heat-absorbing solid body via incident light. The solar receiver may be configured to prevent incident light from heating stationary solid material. For the avoidance of doubt, the term 'the major proportion' may be greater than 50%, greater than 60%, greater than 70%, greater than 80%, greater than 90%, greater than 95% or greater than 99%.

The one or more optical arrangements may direct solar radiation unevenly on to the surface of the absorbing portion of the heat-absorbing solid body such that the heat-absorbing solid body is heated unevenly by the incident solar radiation. The solar receiver may therefore include one or more optical arrangements configured to form a beam of solar radiation incident upon the heat-absorbing solid body wherein the beam of solar radiation includes cross-sectional regions of different concentrations of solar radiation. In an example, the concentration of solar radiation towards the centre of an incident beam of solar radiation may have a higher density of energy than the outer portions of the incident beam of solar radiation. In another example, one or more off-center portions of the incident beam of solar radiation may have a higher energy density than the remaining portions of the incident beam. Using the optical arrangements to form a non-uniform beam in this manner may impart one of more advantages upon a solar receiver. In an example, directing a greater proportion of solar radiation towards the absorbing portions of the heat-absorbing solid body in closest proximity to the coolest part of the flow of working fluid may improve the efficiency of heat transfer from the heat-absorbing solid body to the working fluid flow. Controlling the incident solar radiation in this manner may further prevent overheating of the absorbing portions of the heat absorbing solid body. Furthermore, directing solar radiation on to the surface of the heat-absorbing body such that the working fluid flow is in contact with increasing temperatures of absorber may improve the total quantity of heat energy transferred to the working fluid flow. In this example, working fluid will gradually increase in temperature as it flows along a working fluid flowpath. If incident solar radiation is directed such that the working fluid flowing along the flowpath is exposed to gradually increasing temperatures, the maximum temperature reached by the working fluid as it flows proximate to or through the absorber will be increased. In an alternative example, the optical arrangements may be configured to reduce the flux upon an absorbing element along the flowpath of the working fluid. The working fluid temperature will increase along the flowpath and reducing the incident energy along the flowpath may provide a more uniform temperature throughout the heat-absorbing solid body. It may be advantageous to configure the optical arrangements such that a beam of solar radiation with complex energy distribution is directed towards the absorbing portions of the solar receiver. A complex arrangement may optimise efficiency of energy transfer from the absorber to the working fluid, maximum working temperature of the absorbing surface, and the efficiency of absorption of the incident radiation by the absorber by heating different portions of the absorber to different extents. Such variation may be achieved by using one or more optical arrangements configured to concentrate different amounts of incident solar radiation upon different portions of the solar receiver. It will be appreciated that configuration of the one or more optical arrangements to provide incident solar radiation of varying energy intensity throughout an incident beam in different portions of the incident beam may be advantageously combined with one or more absorbing surfaces of a heat-absorbing solid body configured to exploit different magnitudes of incident energy. In an example, the absorbers or conduits of FIGS. 6A to 6C may be combined with one or more optical arrangements to direct controlled concentrations of solar radiation to different sub-sections of the absorbers or conduits. In this manner, the absorption, reflectivity, and emissivity of materials may be combined with additional control of the concentration of solar radiation experienced by each portion of the heat-absorbing solid body to promote efficient absorption of energy, efficient transfer of energy to the working fluid, efficient cooling, or any other desired criteria of the solar receiver.

To further reduce loss of energy, the solar receiver may further include one or more scavenger or collection ducts to minimise heat loss from the edges of the solar receiver. In operation, the air in and around the solar receiver may become heated. Any residual or lost hot air may be recovered through such ducts for recovery and utilisation of otherwise waste heat. Scavenger or collection ducts may impart the additional benefit of cooling components of the solar receiver including those with a lower thermal tolerance than the portions of the heat-absorbing solid body upon which solar radiation is incident.

The working fluid flowing through or across the heat-absorbing solid body of the solar receiver will generally be in the form of a liquid or a gas. Desirable working fluids will exhibit sufficient heat capacity and heat transfer properties to allow a large proportion of the heat energy stored in the heat-absorbing solid body to be transferred to, and carried away by, the working fluid. Air may be the preferred working fluid due to the balance between its thermal characteristics, ease of availability, low cost and the absence of the requirement to maintain a closed circuit flow. However, air may be unsuitable for some configurations of solar receiver where materials are sensitive to oxidative degradation or reaction with water. Alternative working fluids may impart improved heat transfer or other advantages as desired. Examples of suitable working fluids include air, steam, helium, carbon dioxide, etc. It may be particularly advantageous to utilise particular working fluids depending on the configuration of the wider system in which the solar receiver is housed. For example, a carbon dioxide working fluid would allow the heated fluid to be passed to a super-critical $CO_2$ Brayton turbine without significant additional modifications. The working fluid may flow in a closed, or open circuit as desired.

The solar receiver may also include, or be communicably coupled to, a control system and one or more sensors communicably coupled to the control system. It may be desirable to measure the solar radiation incident upon the receiver and/or the temperature of one or more components of the receiver such that operation of the receiver can be adjusted to ensure efficient and optimal operating conditions. For example, a temperature sensor may be positioned in proximity to, or connected to, the heat-absorbing solid body component. If the temperature of the heat-absorbing solid body breaches a pre-determined level, the movement speed of the heat-absorbing solid body may be increased or, alternatively, one of a plurality of optical arrangements, if present, may be deactivated to reduce the solar radiation incident upon the heat-absorbing solid body. Similarly, one or more light sensors may be positioned in or around the optical arrangements and/or heat-absorbing solid body. When an increase in incident light is detected, the control system may cause the speed of movement of the heat-absorbing solid body to increase to prevent excessive temperatures being reached on the one or more absorbing surfaces of the heat-absorbing solid body. When a sensor detects a decrease in the concentration of incident solar radiation, the movement speed of the heat-absorbing solid body may be slowed by the control system, as required. The control system may additionally, or alternatively, adjust the speed of movement of the heat-absorbing solid body in response to weather data provided by one or more weather forecasting providers.

Many solar receivers are limited by a combination of the high concentrations of solar radiation focused upon a comparably small volume area occupied by the heat-absorbing part of the solar receiver. The solar receivers of the present invention therefore overcome limitations relating to efficiency of heat transfer, excessive temperature and limited cooling, and efficiency of absorption of solar radiation. In particular, these limitations may be overcome by combining two or more of the principles described herein. In an example, a heat-absorbing solid body that effectively utilises the entire volume of the heat-absorbing solid body to provide a high surface areas for adsorption may be used in combination with a plurality of absorbers of a cross-sectional shape, such as an ellipsoidal shape, to yield the greater cross sections of heated absorbing material in contact with working fluid flows passing through or across the absorber.

Computer modelling methodologies such as ray-tracing may be used to predict the portions of the heat-absorbing solid body that will be exposed to solar radiation as the heat-absorbing solid body is moved. Such modelling may also predict the relative concentration of solar radiation that will be absorbed or reflected by each portion of the heat-absorbing solid body over time. The maximum working temperature of each part of the solar receiver may therefore be predicted and the configuration of the receiver and its materials of construction modified such that it operates with an acceptable working temperature threshold by applying the principles of the present invention.

The features of the examples provided may be generally be combined in any technically appropriate manner consistent with methods and solar receiver devices of the present invention. The solar receivers of the present invention may therefore operate at solar radiation concentrations of, up to, or in excess of 500, 600, 700, 750, 800, 900, 1000, 1100, 1200, 1250, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500, or 10000 without comprising the solar receiver. In a particular example, the solar receivers of the present invention may operate at a solar radiation concentration of up to 10000. The skilled person, with the benefit of this disclosure, will be able to identify a suitable receiver configuration, optical arrangements, and materials to allow a solar receiver as disclosed herein to operate at a particular solar radiation concentration. Additional modifications within the scope of the invention will be apparent to those skilled in the art with the benefit of this disclosure.

The invention claimed is:

1. A solar receiver for converting solar radiation at a concentration factor of at least 500 into thermal energy, the solar receiver comprising:
  a heat-absorbing solid body comprising:
    a plurality of absorbing elements and at least a portion of each of the plurality of absorbing elements absorbs incident solar radiation in use, wherein each of the plurality of absorbing elements comprises a conduit wherein the at least a portion of each of the plurality of absorbing elements comprises an outer portion of each conduit of the plurality of absorbing elements; and
    a first surface of one of the plurality of absorbing elements that absorbs the incident solar radiation is formed from a material with a different solar absorption and/or reflection property than a second surface of a second one of the plurality of absorbing elements that absorbs the incident solar radiation, wherein the solar absorption of the first surface and the solar absorption of the second surface are each at least 0.5;
  a fluid system to provide a flow of working fluid proximate to the heat-absorbing solid body, wherein the fluid system flows the working fluid through one or more flowpaths in each conduit of the plurality of absorbing element; and
  a movement device to move the heat-absorbing solid body such that one or more surfaces of the heat-absorbing solid body are periodically exposed to the incident solar radiation;
wherein:
  the incident solar radiation heats at least a portion of the heat-absorbing solid body which in turn heats the working fluid proximate to the heat-absorbing solid body; and
  the at least a portion of the heat-absorbing solid body is configured to:
    promote absorption of the incident solar radiation;
    promote transfer of heat from the at least a portion of the heat-absorbing solid body to the working fluid;
    promote cooling of the at least a portion of the heat-absorbing solid body; or
    promote any combination thereof;

wherein:
  the heat-absorbing solid body is a rotor; and
  the movement device rotates the heat-absorbing solid body.

2. The solar receiver according to claim 1, wherein the movement device does not move, or does not substantially move the heat-absorbing body in a direction along an axis of rotation of the rotor.

3. The solar receiver according to claim 1, wherein the plurality of absorbing elements comprises a plurality of solid absorbers, further wherein:
  the at least a portion of the heat-absorbing solid body comprises an outer portion of each of the plurality of solid absorbers; and
  the fluid system flows working fluid across a heated surface of each of the plurality of solid absorbers.

4. The solar receiver according to claim 1, wherein the plurality of absorbing elements are arranged such that a first absorbing element of the plurality of absorbing elements at least partially occludes a portion of a second absorbing element of the plurality of absorbing elements such that the portion of the second absorbing element that is at least partially occluded is not exposed to incident solar radiation when the solar receiver is in use.

5. The solar receiver according to claim 1, wherein the plurality of absorbing elements are arranged such that a primary absorbing element of the plurality of absorbing elements is exposed to a greater time-averaged flux of solar radiation than a secondary absorbing element of the plurality of absorbing elements.

6. The solar receiver according to claim 1, wherein the plurality of absorbing elements comprises a near absorbing element and a distal absorbing element, wherein the near absorbing element is positioned proximate to an axis of movement of the heat-absorbing solid body and the distal absorbing element is positioned distant from the axis of movement of the heat-absorbing solid body.

7. The solar receiver according to claim 1, wherein the plurality of absorbing elements are arranged such that at least a portion of solar radiation incident upon at least one of the plurality of absorbing elements is reflected towards an absorbing surface of one or more of remaining ones of the plurality of absorbing elements.

8. The solar receiver according to claim 1, wherein at least one of the plurality of absorbing elements is formed from a plurality of materials such that an absorbing surface of the at least one of the plurality of absorbing elements has different solar absorption and/or reflection properties across a surface area upon which solar radiation is incident in use upon the at least one of the plurality of absorbing elements.

9. The solar receiver according to claim 1, wherein at least one of the plurality of absorbing elements has a surface topography, morphology, or texture different from a surface topography, morphology, or texture of another of the plurality of absorbing elements such that the plurality of absorbing elements have different solar absorption and/or reflection properties.

10. The solar receiver according to claim 1, wherein the at least a portion of the heat-absorbing solid body heated by incident solar radiation comprises a selective absorption material that selectively absorbs part of the wavelength spectrum of incident solar radiation.

11. The solar receiver according to claim 1, wherein a perimeter shape of a cross-section of at least one of the plurality of absorbing elements in a plane coincident with the incident solar radiation, wherein the cross-section is elliptical in shape, tear-shaped, pear-shaped, bullet-shaped, or irregular in shape and is configured to:

promote transfer of heat to the working fluid from the heated portions of the at least one of the absorbing elements;

promote reflection of reflected incident solar radiation reflected from the at least one of the plurality of absorbing elements to another one of the plurality of absorbing elements;

promote absorption of the incident solar radiation as thermal energy when the solar receiver is in use; or promote any combination thereof.

12. The solar receiver according to claim 1, further comprising one or more optical arrangements to direct the incident solar radiation on to the at least a portion of each of the plurality of absorbing elements.

13. The solar receiver according to claim 12, wherein the one or more optical arrangements are configured to form a beam of solar radiation incident upon the heat-absorbing solid body, further wherein the beam of solar radiation comprises cross-sectional regions of different concentrations of solar radiation.

14. The solar receiver according to claim 12, wherein the one or more optical arrangements is configured to direct more than 95% of solar radiation incident upon the one or more optical arrangement to the heat-absorbing solid body.

15. The solar receiver according to claim 12, wherein the one or more optical arrangements comprises one or more mirrors, lenses, heliostats, reflectors and/or compound parabolic concentrators (CPCs).

16. The solar receiver according to claim 12, wherein the one or more optical arrangements concentrates solar radiation onto the heat-absorbing solid body at a concentration of up to 10,000.

17. The solar receiver according to claim 13, wherein the one or more optical arrangements direct the incident solar radiation unevenly on to a surface of the heat-absorbing solid body such that the heat-absorbing solid body is heated unevenly.

18. The solar receiver according to claim 1, wherein the heat-absorbing solid body comprises a material selected from the group consisting of zirconium, zirconium oxide and/or cermets thereof, zirconium bromide and/or cermets thereof, chromium oxide and/or cermets thereof, aluminium oxide and/or cermets thereof, molybdenum, steel, steel alloys, tungsten, high refractive index polymer, high temperature resistant absorptive black paint such as Pyromark 2500, silicon carbide, and combinations thereof.

19. A solar receiver for converting solar radiation at a concentration factor of at least 500 into thermal energy, the solar receiver comprising:

a heat-absorbing solid body comprising:

a plurality of absorbing elements and at least a portion of each of the plurality of absorbing elements absorbs incident solar radiation in use; and wherein at least one of the plurality of absorbing elements is formed from a plurality of materials such that the portion of the at least one of the plurality of absorbing elements has different solar absorption and/or reflection properties across a surface area upon which the incident solar radiation is incident in use such that absorptance of the at least one of the plurality of absorbing elements increases along a length of a conduit therein;

a fluid system to provide a flow of working fluid proximate to the heat-absorbing solid body; and a movement device to move the heat-absorbing solid body such that one or more surfaces of the heat-absorbing solid body are periodically exposed to the incident solar radiation;

wherein:

the incident solar radiation heats at least a portion of the heat-absorbing solid body which in turn heats the working fluid proximate to the heat-absorbing solid body; and wherein:

the heat-absorbing solid body is a rotor; and the movement device rotates the heat-absorbing solid body.

20. A solar receiver for converting solar radiation at a concentration factor of at least 500 into thermal energy, the solar receiver comprising:

a heat-absorbing solid body comprising:

a plurality of absorbing elements and at least a portion of each of the plurality of absorbing elements absorbs incident solar radiation in use, wherein each of the plurality of absorbing elements comprises a conduit, wherein the at least a portion of each of the plurality of absorbing elements comprises an outer portion of each conduit of the plurality of absorbing elements; and wherein at least one of the plurality of absorbing elements has a surface topography, morphology, or texture different from a surface topography, morphology, or texture of another of the plurality of absorbing elements such that the plurality of absorbing elements have different solar absorption and/or reflection properties and the absorbing element that will experience the greater solar flux when in use has a lower absorptivity, wherein the solar absorption of a first surface of the at least one of the plurality of absorbing elements and the solar absorption of a second surface of the another of the plurality of absorbing elements are each at least 0.5;

a fluid system to provide a flow of working fluid proximate to the heat-absorbing solid body, wherein the fluid system flows the working fluid through one or more flowpaths in each conduit of the plurality of absorbing element; and a movement device to move the heat-absorbing solid body such that one or more surfaces of the heat-absorbing solid body are periodically exposed to the incident solar radiation;

wherein:

the incident solar radiation heats at least a portion of the heat-absorbing solid body which in turn heats the working fluid proximate to the heat-absorbing solid body; and wherein:

the heat-absorbing solid body is a rotor; and the movement device rotates the heat-absorbing solid body.

* * * * *